(12) United States Patent
Ishimatsu et al.

(10) Patent No.: US 9,546,705 B2
(45) Date of Patent: Jan. 17, 2017

(54) BUSH

(71) Applicants: HONDA MOTOR CO., LTD., Minato-ku, Tokyo (JP); YAMASHITA RUBBER CO., LTD., Fujimino-shi, Saitama (JP)

(72) Inventors: Hisashi Ishimatsu, Wako (JP); Tetsu Ogawa, Wako (JP); Masashi Furuya, Wako (JP); Takahiro Kato, Fujimino (JP); Jun Saito, Fujimino (JP); Shigeo Kojima, Fujimino (JP); Keiichi Arakawa, Fujimino (JP)

(73) Assignees: Honda Motor Co., Ltd., Tokyo (JP); Yamashita Rubber Co., Ltd., Saitama (JP)

( * ) Notice: Subject to any disclaimer, the term of this patent is extended or adjusted under 35 U.S.C. 154(b) by 0 days.

(21) Appl. No.: 14/378,375

(22) PCT Filed: Dec. 18, 2012

(86) PCT No.: PCT/JP2012/082748
§ 371 (c)(1),
(2) Date: Aug. 13, 2014

(87) PCT Pub. No.: WO2013/121674
PCT Pub. Date: Aug. 22, 2013

(65) Prior Publication Data
US 2015/0008630 A1 Jan. 8, 2015

(30) Foreign Application Priority Data

Feb. 15, 2012 (JP) .................. 2012-031160

(51) Int. Cl.
*F16F 1/38* (2006.01)
*F16F 1/16* (2006.01)
*B60G 21/055* (2006.01)

(52) U.S. Cl.
CPC .............. *F16F 1/38* (2013.01); *B60G 21/0551* (2013.01); *F16F 1/16* (2013.01); *F16F 1/3835* (2013.01);
(Continued)

(58) Field of Classification Search
CPC .............. F16F 1/3835; F16F 1/38; F16F 1/16; B60G 21/0551; B60G 21/055; B60G 2202/135; B60G 2204/1222; B60G 2206/821; B60G 2204/41
(Continued)

(56) References Cited

U.S. PATENT DOCUMENTS 5,013,166 A * 5/1991 Domer .......................... 384/220
5,224,790 A * 7/1993 Hein .................. B60G 21/0551
267/140.3

(Continued)

FOREIGN PATENT DOCUMENTS

JP S62-83709 A 5/1987
JP H04-316729 A 11/1992
(Continued)

OTHER PUBLICATIONS

Machine translation in English for JP 2004-67094A; Inventor: Tsuiki et al.; 7 pages; Retrieve Date: Jun. 23, 2015.*
(Continued)

*Primary Examiner* — Thomas J Williams
*Assistant Examiner* — Mariano Sy
(74) *Attorney, Agent, or Firm* — Carrier Blackman & Associates, P.C.; William D. Blackman; Joseph P. Carrier

(57) ABSTRACT

A bush (20) includes a base material (45) that is disposed at a vehicle body (12), an inter ring (48) that is integrally disposed at the base material (45), and a surface layer (51) that is disposed inside the inter ring (48). The inter ring (48) is arranged along an opening (47) in such a manner as to
(Continued)

surround the opening (47). The surface layer (51) includes an insertion hole (52) and is integrally formed from a self-adhesive elastic material into a thin wall shape. A stabilized rod (14) is inserted into the insertion hole (52).

12 Claims, 14 Drawing Sheets

(52) U.S. Cl.
CPC ....... *F16F 1/3842* (2013.01); *B60G 2202/135* (2013.01); *B60G 2204/1222* (2013.01); *B60G 2204/41* (2013.01); *B60G 2206/821* (2013.01)

(58) Field of Classification Search
USPC ............... 267/279, 276, 280, 293, 294, 189; 384/220, 436; 280/124.107, 124.166
See application file for complete search history.

(56) References Cited

U.S. PATENT DOCUMENTS

| | | | | |
|---|---|---|---|---|
| 5,352,044 | A * | 10/1994 | Jordens et al. | 384/140 |
| 5,520,465 | A * | 5/1996 | Kammel | 384/220 |
| 5,565,251 | A * | 10/1996 | Tang et al. | 428/36.8 |
| 6,241,225 | B1 * | 6/2001 | Krause | 267/292 |
| 6,513,801 | B1 * | 2/2003 | McCarthy | 267/293 |
| 6,893,034 | B2 * | 5/2005 | Fader | 280/124.166 |
| 8,292,312 | B2 * | 10/2012 | Kato | B60G 21/0551 |
| | | | | 267/141.1 |
| 8,882,092 | B2 * | 11/2014 | Jang | 267/294 |
| 8,888,082 | B2 * | 11/2014 | Kang et al. | 267/294 |
| 2007/0241526 | A1 * | 10/2007 | Plante | 280/124.107 |
| 2008/0067727 | A1 * | 3/2008 | Schwarz et al. | 267/141.1 |

FOREIGN PATENT DOCUMENTS

| | | | | |
|---|---|---|---|---|
| JP | 3502234 | B2 | | 12/2003 |
| JP | 2004-067094 | A | | 3/2004 |
| JP | 2004067094 | A | * | 3/2004 |
| JP | 2004-257541 | A | | 9/2004 |
| JP | 2004257541 | A | * | 9/2004 |
| JP | 3678667 | B2 | | 5/2005 |
| JP | 2006-118578 | A | | 5/2006 |
| JP | 2006118578 | A | * | 5/2006 |
| JP | 3125081 | U | | 9/2006 |
| JP | 2008-074121 | A | | 4/2008 |
| JP | 2008074121 | A | * | 4/2008 |
| JP | 2009-073362 | A | | 4/2009 |
| JP | 2009073362 | A | * | 4/2009 |

OTHER PUBLICATIONS

Machine translation in English for JP 2004-257541A; Inventor: Nishi; 6 pages; Retrieve Date: Jun. 23, 2015.*
Machine translation in english for JP 2006-118578A; Inventor: Ichimura; 3 pages; Retrieve Date: Jun. 23, 2015.*
Machine translation in English for JP 2008-74121A; Inventor: Miyamoto et al.; 11 pages; Retrive Date: Jun. 23, 2015.*
Machine translation in English for JP 2009-73362A; Inventor: Kato et al.; 14 pages; Retrieve Date: Jun. 23, 2015.*
Office Action issued in the corresponding Japanese Patent Application 2014-500057, date of drafting Jan. 27, 2016.

* cited by examiner (a)

(b)

BUSH

TECHNICAL FIELD

The present invention relates to a bush formed so as to be capable of being mounted on a vehicle body, the bush being provided with a through-hole through which a stabilizer rod can be inserted, and adapted so that it is possible to insert the stabilizer rod through the through-hole and have the vehicle body support the stabilizer rod.

BACKGROUND ART

Generally, in a stabilizer rod supporting structure, the torsion section of the stabilizer rod is extended in the lateral direction, a bush is fitted into each of left and right end parts of the torsion section, and each of the bushes is mounted on the vehicle body interposed by a mounting bracket. By mounting each of the bushes on the vehicle body, the stabilizer rod is mounted on the vehicle body interposed by the bushes. The stabilizer rod has an arm section provided to the left and right end parts of the torsion section, and left and right suspension units are provided to the left and right arm sections.

Known stabilizer rod supporting structures include ones in which a polygonal ring is fixed to the left and right end parts of the torsion section, a bush is provided adjacent to the polygonal ring, and the end part of a sleeve provided to the bush is engaged with the polygonal ring (as disclosed in, e.g., Patent Document 1).

Having the end part of the sleeve be engaged with the polygonal ring connects the torsion section and the bush so that the torsion section and the bush do not rotate relative to each other. Therefore, when the torsion section twists, the torsion section and the bush are prevented from rotating relative to each other, and the sleeve is inhibited from slipping relative to the torsion section. However, the support structure disclosed in the abovementioned Patent Document 1 involves the need for the polygonal rings which are fixed to the left and right end parts of the torsion section and the sleeves which are engaged with the polygonal rings, and therefore requires a larger number of components, impeding efforts to minimize cost.

Known stabilizer rod supporting structures also include ones in which an outer frame of a bush supporting the left and right end parts of the torsion section is formed from a base material and an inner periphery part (hereafter referred to as a surface layer) is formed on the inside of the base material from a highly slidable rubber (as disclosed in, e.g., Patent Document 2). Thus, forming the surface layer of the bush from a rubber exhibiting high slidability (i.e., "highly slidable rubber") and causing the highly slidable rubber to engage with the left and right end parts of the torsion section make it possible to reduce the sliding resistance acting on the torsion section.

Accordingly, causing the highly slidable rubber to engage with the left and right end parts of the torsion section makes it possible to reduce the sliding resistance between the bush (highly slidable rubber) and the torsion section when the torsion section is twisted. This makes it possible to suppress stick-slip sounds generated when there is a slippage between the torsion section and the bush.

However, the bush in Patent Document 2 is formed so that the surface layer (highly slidable rubber) of the bush has a large thickness substantially equal to the wall thickness of the base material. With the highly slidable rubber, slippage of the base material increases, as does hysteresis in the bush, in order to reduce the sliding resistance. Therefore, forming the surface layer (highly slidable rubber) of the bush so as to have a large thickness substantially equal to the wall thickness of the base material makes it more difficult to impart the bush with spring characteristics.

PRIOR ART LITERATURE

Patent Literature

[Patent Document 1] Japanese Patent No. 3678667
[Patent Document 2] Japanese Patent No. 3502234

SUMMARY OF INVENTION

Technical Problem

The present invention addresses the problem of providing a bush that makes it possible to minimize cost and inhibit the stabilizer rod from slipping relative to the bush, and that has reduced hysteresis characteristics relative to deformation and a smaller change in characteristics in response to a variation in input.

Solution to Problem

The invention according to a first aspect provides a bush for supporting a stabilizer rod against a vehicle body, the bush comprising:

a base material provided to the vehicle body and having an opening into which the stabilizer rod can be inserted;

an inter-ring integrally provided to the base material and thereby positioned along the opening; and a surface layer integrally formed on the inside of the inter-ring from a self-adhesive elastic material so as to be thinner than the wall thickness of the base material, the surface layer having a through-hole into which the stabilizer rod can be inserted.

In the invention according to a second aspect, the surface layer is preferably formed so that: the wall thickness of the surface layer is smaller than the wall thickness of the base material layer, the base material layer being the portion of the base material between the inter-ring and the opening; and the wall thickness of the base material layer is larger than the wall thickness of the surface layer when the stabilizer rod (14) is inserted through the through-hole.

In the invention according to a third aspect, the base material preferably blocks two axial ends of the surface layer.

In the invention according to a fourth aspect, the surface layer preferably has a wall thickness that varies around the circumferential direction.

In the invention according to a fifth aspect, the wall thickness of the surface layer varies along the axial direction.

In the invention according to a sixth aspect, the surface layer preferably has, in a part thereof, a thick-walled part formed so as to have a larger wall thickness, it being possible to inject the self-adhesive elastic material in a molten state from the thick-walled part.

In the invention according to a seventh aspect, preferably:

a distal end part of a protrusion protruding from a part of the base material towards the surface layer is exposed beyond the surface layer and caused to abut on the stabilizer rod; and the surface layer is formed so as to be divided by the protrusion.

In the invention according to an eighth aspect, preferably a slit for opening up the opening is formed, and the self-adhesive elastic material is extended from the surface layer into the slit.

In the invention according to a ninth aspect, preferably, an outer circumferential surface of the inter-ring is provided so as to be in contact with an inner circumferential surface of the opening, and the surface layer is integrally provided to an inner circumferential surface of the inter-ring.

Advantageous Effects of Invention

In the invention according to the first aspect, a surface layer is integrally formed thinly, on the inside of an opening provided to the base material, from a self-adhesive elastic material, and the surface layer is provided with a through-hole into which the stabilizer rod can be inserted. Self-adhesiveness refers to a property in which the bonding state of a molecular arm of an elastic material changes, whereby the elastic material itself deforms fluidly so as to fill a gap (also known as self-bonding property). Generally, in an elastic material of such description, the surface shape adapts to match that of a contacting member, resulting in a strong adhesive force.

Accordingly, using a self-adhesive elastic material for the surface layer allows the stabilizer rod and the surface layer to be brought into intimate contact while being inhibited from slipping relative to each other in a state in which the stabilizer rod is inserted through the through-hole of the surface layer. Since it is possible to obtain an intimate contact between the stabilizer rod and the surface layer as well as prevent the stabilizer rod from slipping relative to the surface layer, the sealing performance between the stabilizer rod and the surface layer can be improved.

In addition, the stabilizer rod can be inhibited from slipping relative to the surface layer (i.e., the bush) merely by integrally forming a self-adhesive surface layer thinly on the inside of the opening provided to the base material. This obviates the need to provide a polygonal ring to the stabilizer rod or the need to provide a sleeve engaging with the polygonal ring to the bush. The resulting reduction in the number of components makes it possible to minimize cost.

Forming the surface layer so as to be thinner than the wall thickness of the base material makes it possible to exploit the inherent spring characteristics of the base material without being affected by the surface layer. This makes it possible, when the stabilizer rod is twisted, to cause the base material to elastically deform and apply an appropriate restoring force on the stabilizer rod, and when the stabilizer rod is untwisted, to cause the base material to restore suitably while minimizing any variation in the restoring force transmitted to the stabilizer rod. In other words, it is possible to reduce hysteresis characteristics relative to deformation and minimize any change in the reaction force characteristics in response to a variation in input, Causing the surface layer to suitably deform so as to track the twisting of the stabilizer rod and inhibiting the stabilizer rod from slipping relative to the surface layer (i.e., the bush) make it possible to minimize wear of the surface of the surface layer that comes into contact with the stabilizer rod. Thus minimizing wear of the surface layer makes it possible to increase the durability of the bush.

An inter-ring is positioned along the opening of the base material so as to enclose the opening with the inter-ring, and a surface layer is provided to the inside of the inter-ring. This makes it possible to support the base material with the inter-ring, allowing the strain in the base material to be suppressed. Suppressing the strain in the base material makes it possible, when the stabilizer rod is twisted, to maintain a gap in a stable manner between the base material and the stabilizer rod. This makes it possible to prevent a further gap (i.e., space) from forming between the stabilizer rod and the surface layer and more effectively prevent the stabilizer rod from slipping relative to the surface layer, allowing the sealing performance between the stabilizer rod and the surface layer to be further improved.

In addition, stably maintaining the gap between the base material and the stabilizer rod makes it possible to transmit the force inputted into to the stabilizer rod through the surface layer and into the base material in a satisfactory manner, apply an appropriate reaction force corresponding to the load input, and exploit the spring characteristics of the bush even more satisfactorily.

In the invention according to the second aspect, the wall thickness of the surface layer is set to be smaller than that of the base material layer, and the wall thickness of the base material layer is set to be larger than the wall thickness of the surface layer when the stabilizer has been inserted. Thus setting a large amount of compression in the base material makes it possible to exploit the inherent spring characteristics of the base material without being affected by the surface layer.

In the invention as in claim 3, blocking both axial ends of the surface layer using the base material makes it possible to inhibit the surface layer from displacing or flowing in the axial direction. This makes it possible to minimize wear in the surface of the surface layer that comes into contact with the stabilizer rod, allowing the durability of the bush to be increased.

Also, inhibiting the surface layer from displacing or flowing in the axial direction makes it possible to maintain, in a stable manner, the surface layer in a predetermined shape. Accordingly, the characteristics of the surface layer (i.e., self-adhesiveness and adhesiveness) can be suitably exploited. It is thereby possible to improve, e.g., the sealing performance between the surface layer and the stabilizer rod.

In the invention as in the fourth aspect, varying the wall thickness of the surface layer around the circumferential direction makes it possible to obtain, in the circumferential direction of the surface layer, a thick-walled part in which the surface layer has a large wall thickness. This makes it possible to dissipate the stress (i.e., load), generated in the surface layer by the stabilizer rod being twisted, into the thick-walled part, allowing the load generated in the surface layer to be effectively dispersed into the thick-walled part and suitably alleviated inside the surface layer. This makes it possible to suitably adjust the surface pressure acting on the opening of the base material from the surface layer, and more effectively minimize the load on the surface layer jointed to the base material and on the interface between the base material and the surface layer.

In addition, effectively dispersing the load generated in the surface layer into the thick-walled part makes it possible to inhibit the surface layer from suffering a localized permanent set in fatigue or elastic deformation.

In the invention according to the fifth aspect, varying the wall thickness of the surface layer along the axial direction makes it possible to obtain, along the axial direction of the surface layer, a thick-walled part in which the surface layer has a large wall thickness. Thus providing a thick-walled part along the axial direction of the surface layer makes it possible to obtain the same actions and effects as those according to the fourth aspect in response to a load input in the axial direction.

In the invention according to the sixth aspect, a thick-walled part having a larger wall thickness is formed in a part of the surface layer, it being possible to inject the self-adhesive elastic material from the thick-walled part. Thus providing the surface layer with a thick-walled part in which the self-adhesive elastic material can be injected makes it possible to uniformly laminate the high-tack material constituting the surface layer, and the wall thickness of the surface layer can be further reduced. This makes it possible to obtain a bush having spring characteristics even near those inherent to the base material.

In the invention according to the seventh aspect, a protrusion is provided so as to protrude from a part of the base material towards the surface layer, and the protrusion is made to abut on the stabilizer rod, whereby the surface layer is divided by the protrusion. This makes it possible to disperse the stress (i.e., load) generated in the surface layer by the stabilizer rod being twisted into the divided surface layers and minimize the deformation in the surface layer.

In the invention according to the eighth aspect, the self-adhesive elastic material is extended from the surface layer into a slit for opening up the opening of the base material. As a result, packing the self-adhesive elastic material into the slit makes it possible to prevent the entry of mud, pebbles or the like, or of water by, e.g., capillary action, into the slit, and to further improve the sealing performance between the stabilizer rod and the surface layer.

In the invention according to the ninth aspect, the inter-ring is brought into contact with the opening, and the surface layer is integrally provided to the inner circumferential surface of the inter-ring. The base material (i.e., the opening) is thereby inhibited by the inter-ring from deforming, making it possible to impart a more stable reaction force in response to a twisting of the stabilizer rod. In addition, the distribution of surface pressure around the opening can be made more uniform.

In addition, bringing the inter-ring into contact with the opening makes it possible for the surface layer to be integrally provided directly on the inner circumferential surface of the inter-ring. The dimensional precision of the inner circumferential surface of the inter-ring, which is a metal member, can be enhanced, and the joining force during molding can be increased and the durability can be improved.

DESCRIPTION OF EMBODIMENTS

Several preferred embodiments of the present invention will now be described with reference to the accompanying drawings. The terms "front (Fr)", "rear (Rr)", "left (L)", and "right (R)" indicate directions as observed by the driver.

[First Embodiment]

Figure 1:
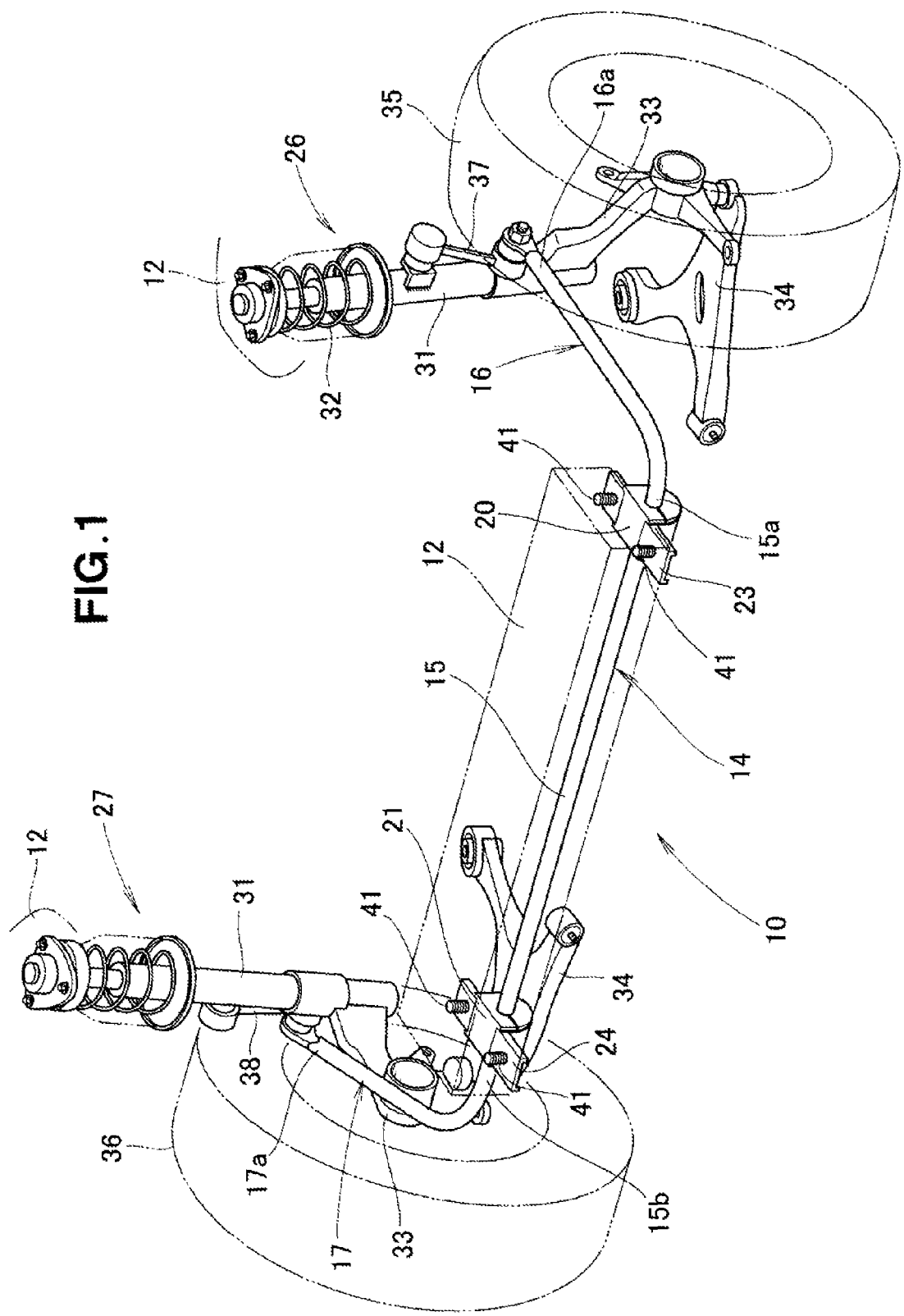
FIG. 1 is a perspective view showing a stabilizer rod supporting structure including a bush according to a first embodiment of the present invention.

As shown in FIG. 1, in a stabilizer rod supporting structure 10 according to a first embodiment, a stabilizer rod 14 is provided below a body frame (vehicle body) 12, a torsion section 15 of the stabilizer rod 14 is extended laterally (i.e., in the left-right direction), a left arm section 16 is provided so as to bend rearwards from the left end part 15a of the torsion section 15, and a right arm section 17 is provided so as to bend rearwards from the right end part 15b of the torsion section 15.

In addition, in the stabilizer rod supporting structure 10, left and right bushes 20, 21 are respectively fitted onto the left and right end parts 15a, 15b of the torsion section 15, the left bush 20 is mounted on the body frame 12 by a left mounting bracket 23, and the right bush 21 is mounted on the body frame 12 by a right mounting bracket 24. The left and right bushes 20, 21 are symmetrical components; the following description will be given with regards to the left bush 20 and a description for the right bush 21 shall not be provided.

A left suspension unit 26 is provided to the distal end part 16a of the left arm section 16 interposed by a left link 37. A right suspension unit 27 is provided to the distal end part 17a of the right arm section 17 interposed by a right link 38.

The left suspension unit 26 includes a damper 31 mounted on the body frame 12, a spring 32 provided coaxially on the upper part of the damper 31, a knuckle 33 mounted on the lower part of the damper 31, and a suspension arm 34 to which the knuckle 33 is connected. The damper 31 is connected to the distal end part 16a of the left arm section 16 interposed by the left link 37. A left wheel 35 is provided to the knuckle 33.

The right suspension unit 27 is symmetrical with the left suspension unit 26. Therefore, the constituent components of the right suspension unit 27 are affixed with the same numerals as those for the left suspension unit 26, and a description shall not be provided. The damper 31 of the right suspension unit 27 is connected to the distal end part 17a of the right arm section 17 interposed by the right link 38. A right wheel 36 is connected to the knuckle 33 of the right suspension unit 27.

Components such as the left and right suspension units 26, 27 and the stabilizer rod 14 constitute a strut-type suspension device. In the stabilizer rod 14, when, e.g., the vehicle body undergoes a roll and the left and right wheels 35, 36 move vertically in opposing directions, the left and right arm sections 16, 17 move vertically (i.e., vibrate) in opposing directions, and the torsion section 15 is twisted. The twisting of the torsion section 15 generates a moment which suppresses the rolling motion of the vehicle body, making it possible for the vehicle to maintain an adequate steering stability.

Figure 2:
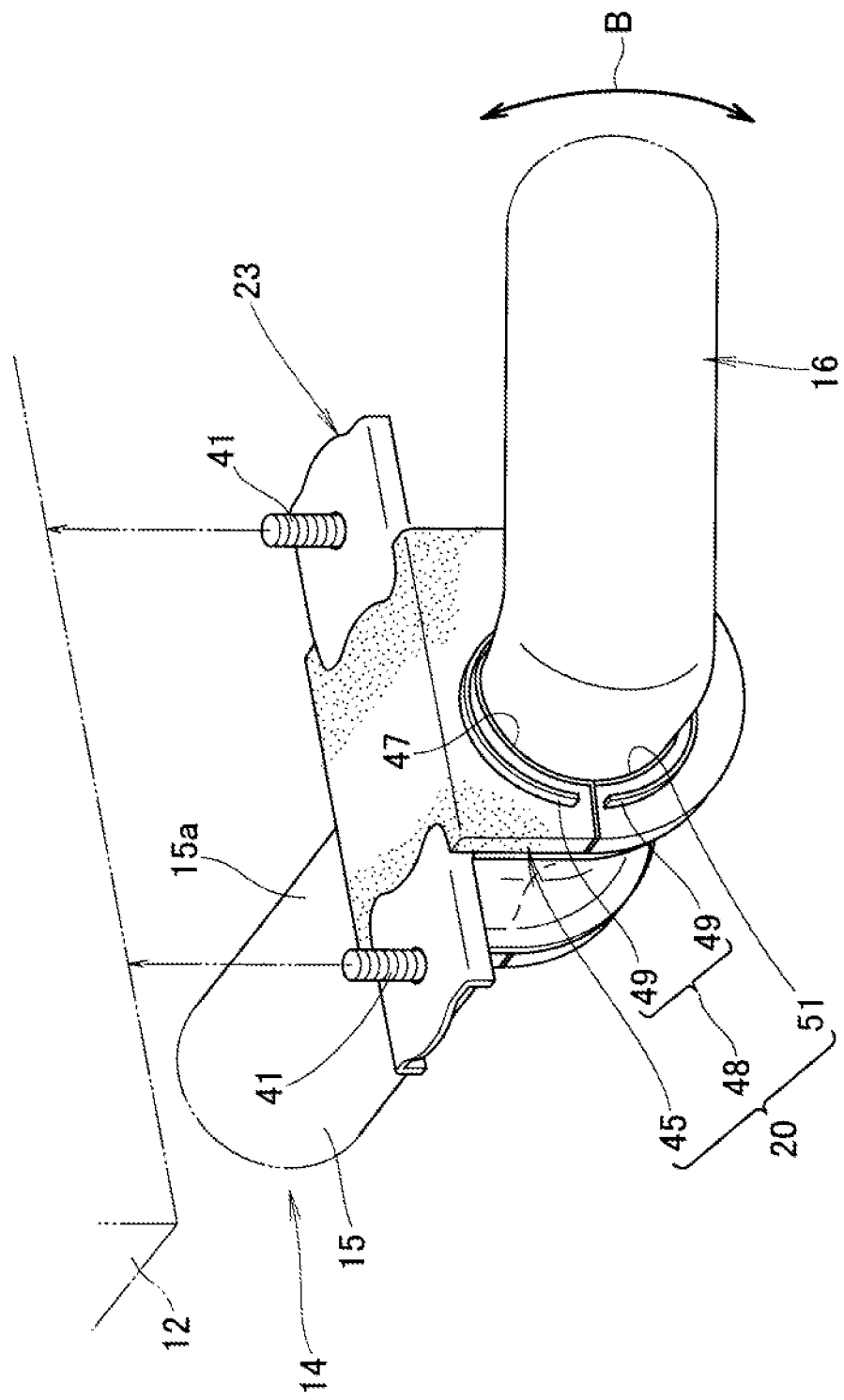
FIG. 2 is a perspective view showing the bush along with a mounting bracket of FIG. 1.

As shown in FIG. 2, the left bush 20 is fitted onto the left end part 15a of the torsion section 15, the left mounting bracket 23 is engaged with the left bush 20, and the left mounting bracket 23 is mounted by a bolt 41 on the lower part of the body frame 12. The left bush 20 is thereby mounted on the lower part of the body frame 12 by means of the left mounting bracket 23 and the bolt 41. As with the left bush 20, the right bush 21 shown in FIG. 1 is mounted on the lower part of the body frame 12 by means of the right mounting bracket 24 and the bolt 41.

The left end part 15a of the torsion section 15 is inserted through the left bush 20 and the right end part 15b of the torsion section 15 is inserted through the right bush 21. The stabilizer rod 14 is thereby supported by the lower part of the body frame 12 by means of the left and right bushes 20, 21.

Figure 3:
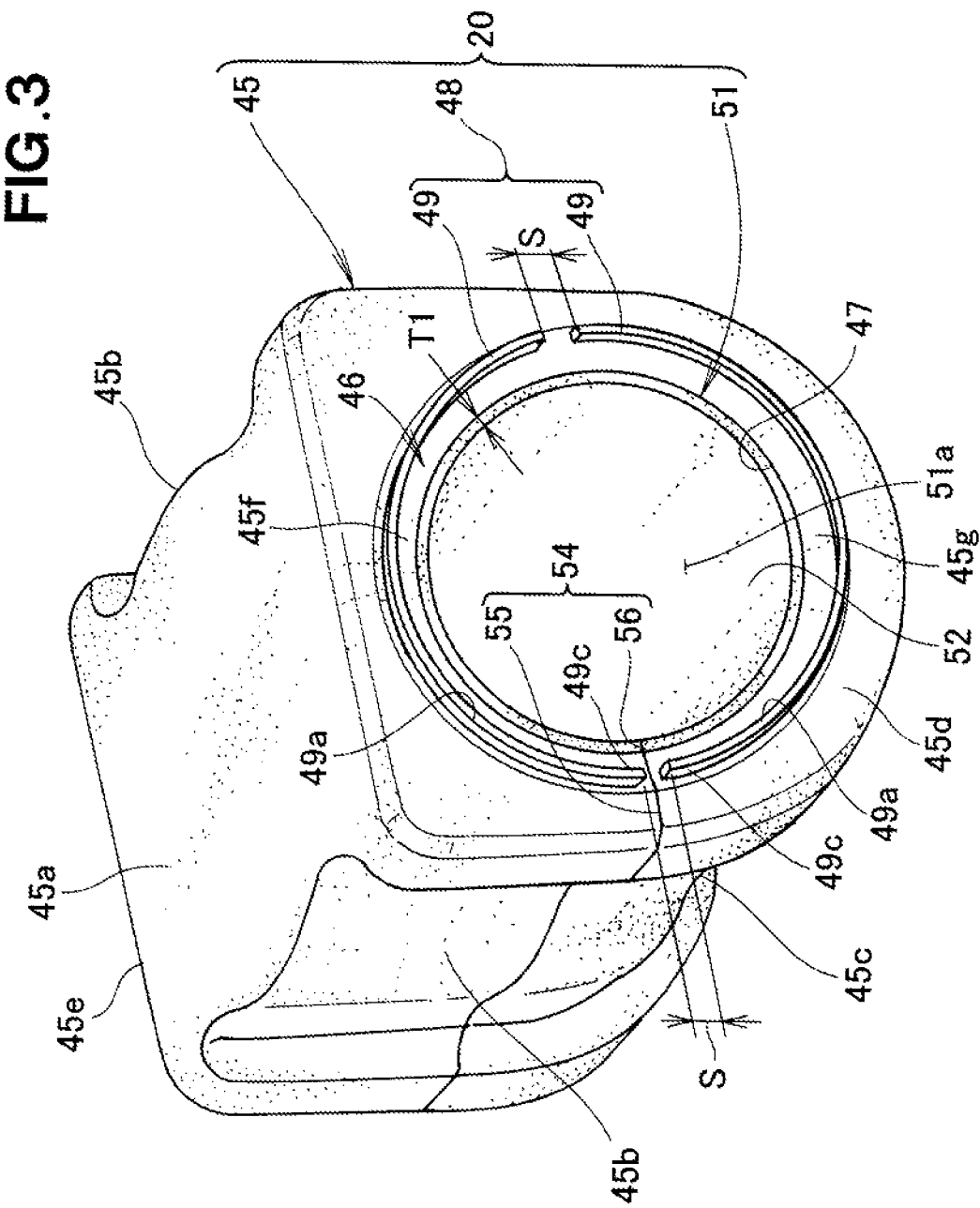
FIG. 3 is an expanded perspective view of the bush shown in FIG. 2.
Figure 4:
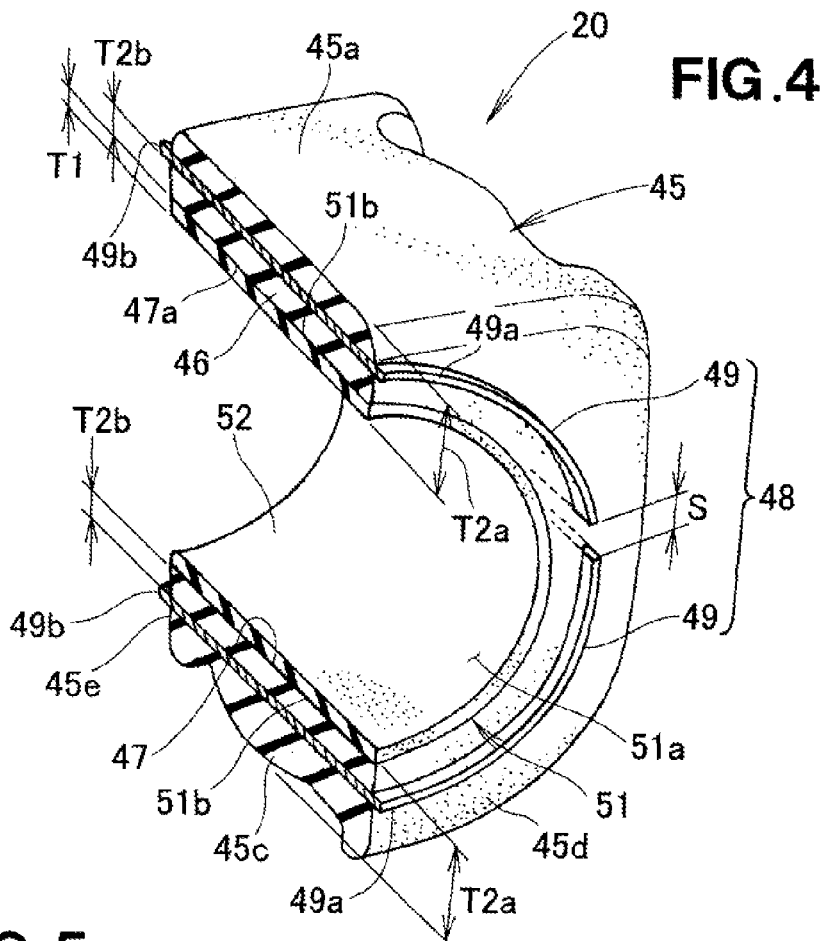
FIG. 4 is a cross-section perspective view of the bush shown in FIG. 3.

As shown in FIGS. 3 and 4, the left bush 20 includes a base material 45 formed so as to be capable of engaging with the recess of the left mounting bracket 23 (see FIG. 2), an inter-ring 48 integrally provided to the base material 45, and a surface layer 51 integrally formed thinly on the inside of the inter-ring 48. In the left bush 20, when the base material 45 and the surface layer 51 are formed by two-color molding, the inter-ring 48 is formed by insert-molding on the base material 45. A bush slit 54 is formed in the left bush 20. The bush slit 54 is formed so as to extend from a side section 45b of the base material 45 to the inner circumferential surface 51a of the surface layer 51. Through opening up the bush slit 54, the left bush 20 is fitted into the left end part 15a of the torsion section 15 (see FIG. 2).

The base material 45 is made from natural rubber (NR), and has a substantially arcuate profile. Specifically, the base material 45 has: an upper end section 45a capable of abutting on the lower part of the body frame 12 (see FIG. 2); two side sections 45b provided downwards from side edges of the upper end section 45a; a bottom section 45c provided below the two side sections 45b; two end sections 45d, 45e provided downwards from side edges of the upper end section 45a; and an opening 47 provided at the center.

The upper end section 45a is formed flat so as to be capable of abutting on the lower part of the body frame 12. The two side sections 45b and the bottom section 45c are formed to have a substantially U-shaped cross-section so as to be capable of being fitted into the left mounting bracket 23. The two end sections 45d, 45e are formed flat so as to be orthogonal with the upper end section 45a. The opening 47 penetrates the center of the base material 45 from one end section 45d to the other end section 45e so as to allow the stabilizer rod 14 to be inserted through. Forming the opening 47 in the base material 45 sets the wall thickness of the base material 45 to T2a.

The natural rubber forming the base material 45 causes the base material 45 to deform elastically and applies an appropriate restoring force to the torsion section 15 of the stabilizer rod 14 when the torsion section 15 is twisted (see FIG. 2).

The inter-ring 48 includes an upper half-split link part 49 enclosing the upper half of the opening 47 and a lower half-split link part 49 enclosing the lower half of the opening 47. The upper half-split link part 49 is a semi-arcuate member made from a metal, and is integrally insert-molded on a portion 45f of the base material 45 facing the upper half of the opening 47. In other words, the upper half-split link part 49 is located around the upper half of the opening 47 so as to enclose the upper half.

The lower half-split link part 49 is a member identical to the half-split link part 49, and is integrally insert-molded on a portion 45g of the base material 45 facing the lower half of the opening 47. In other words, the lower half-split link part 49 is located around the lower half of the opening 47 so as to enclose the lower half.

The upper half-split link part 49 and the lower half-split link part 49 are located around the same arc. The upper half-split link part 49 and the lower half-split link part 49 are located so that a given vertical gap S is present therebetween. One end 49a of each of the upper half-split link part 49 and the lower half-split link part 49 protrudes slightly from one end section 45d of the base material 45. Similarly, the other end 49b of each of the upper half-split link part 49 and the lower half-split link part 49 protrudes slightly from the other end section 45e of the base material 45.

In the state described above, the upper wall thickness of the base material 45 between the upper half-split link part 49 and the inner circumferential surface 47a of (the upper half of) the opening 47 is set to T2b. The lower wall thickness between the lower half-split link part 49 and the inner circumferential surface 47a of (the lower half of) the opening 47 is set to be the same as the upper wall thickness T2b.

Thus, the upper half of the opening 47 being enclosed by the upper half-split link part 49 and the lower half of the opening 47 being enclosed by the lower half-split link part 49 result in the entire circumference of the opening 47 being enclosed by the metal inter-ring 48. The entire circumference of the opening 47 being enclosed by the inter-ring 48 results in the portion of the base material 45 between the inter-ring 48 and the opening 47 forming an annular base material layer 46. In other words, the base material layer 46 is formed into an annular shape having a wall thickness of T2b.

The surface layer 51 is an annular thick-walled part integrally formed from a self-adhesive elastic material on the inside of the opening 47 (or more specifically, the inner circumferential surface 47a of the opening 47). As used throughout the present specification and in the claims, the term "self-adhesive elastic material" is equivalent to the phrase "slip-resistant elastic or rubber material". The surface layer 51 is formed thinly so as to have a wall thickness T1 smaller than the wall thickness T2a of the base material 45 and smaller than the wall thickness T2b of the base material layer 46. In addition, forming the surface layer 51 annularly results in the surface layer 51 having a through-hole 52 through which the stabilizer rod 14 can be inserted. The through-hole 52 is formed coaxially with the opening 47 so as to penetrate, on the inner side of the opening 47, from one end section 45d to the other end section 45e. Butyl rubber (also known in the art as IIR or isobutylene isoprene rubber) is an example of a slip-resistant or self-adhesive elastic material which may be used in the practice of the present invention.

The bush slit 54 has: a base material slit 55 formed on one of the side sections 45*b* of the base material 45; and a surface layer slit 56 formed on the surface layer 51. The bush slit 54 is formed of the base material slit 55 and the surface layer slit 56 in a straight line passing between one side part 49*c* of the upper half-split link part 49 and one side part 49*c* of the lower half-split link part 49.

Figure 5:
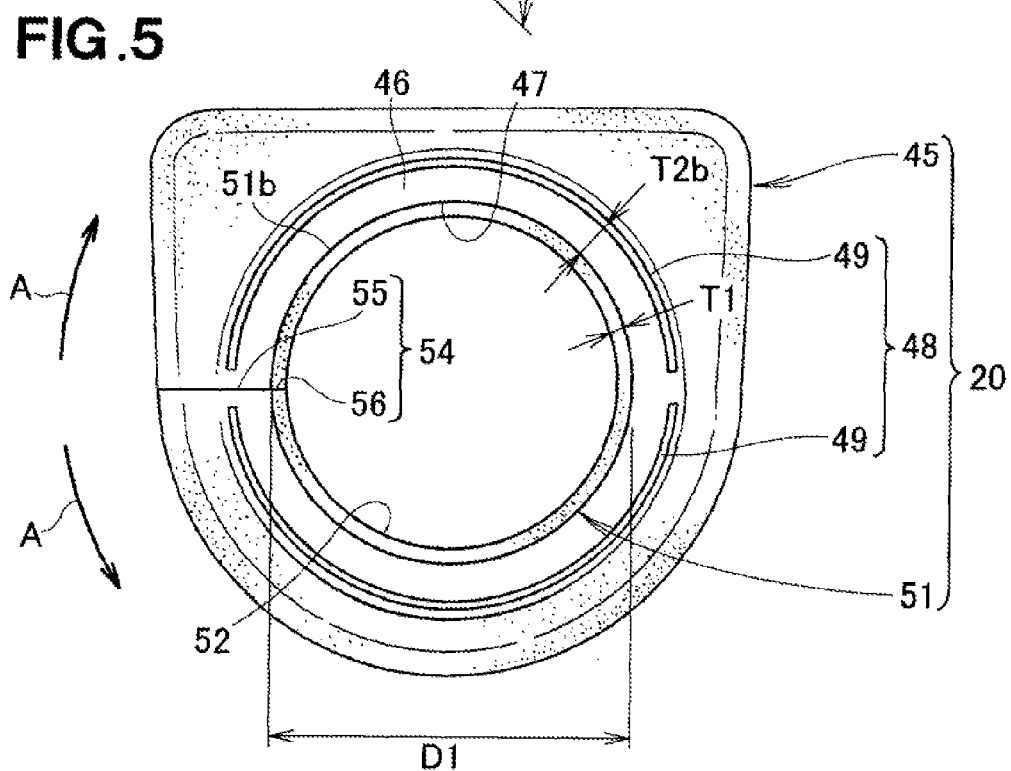
FIG. 5 is a front view of the bush shown in FIG. 3.
Figure 6:
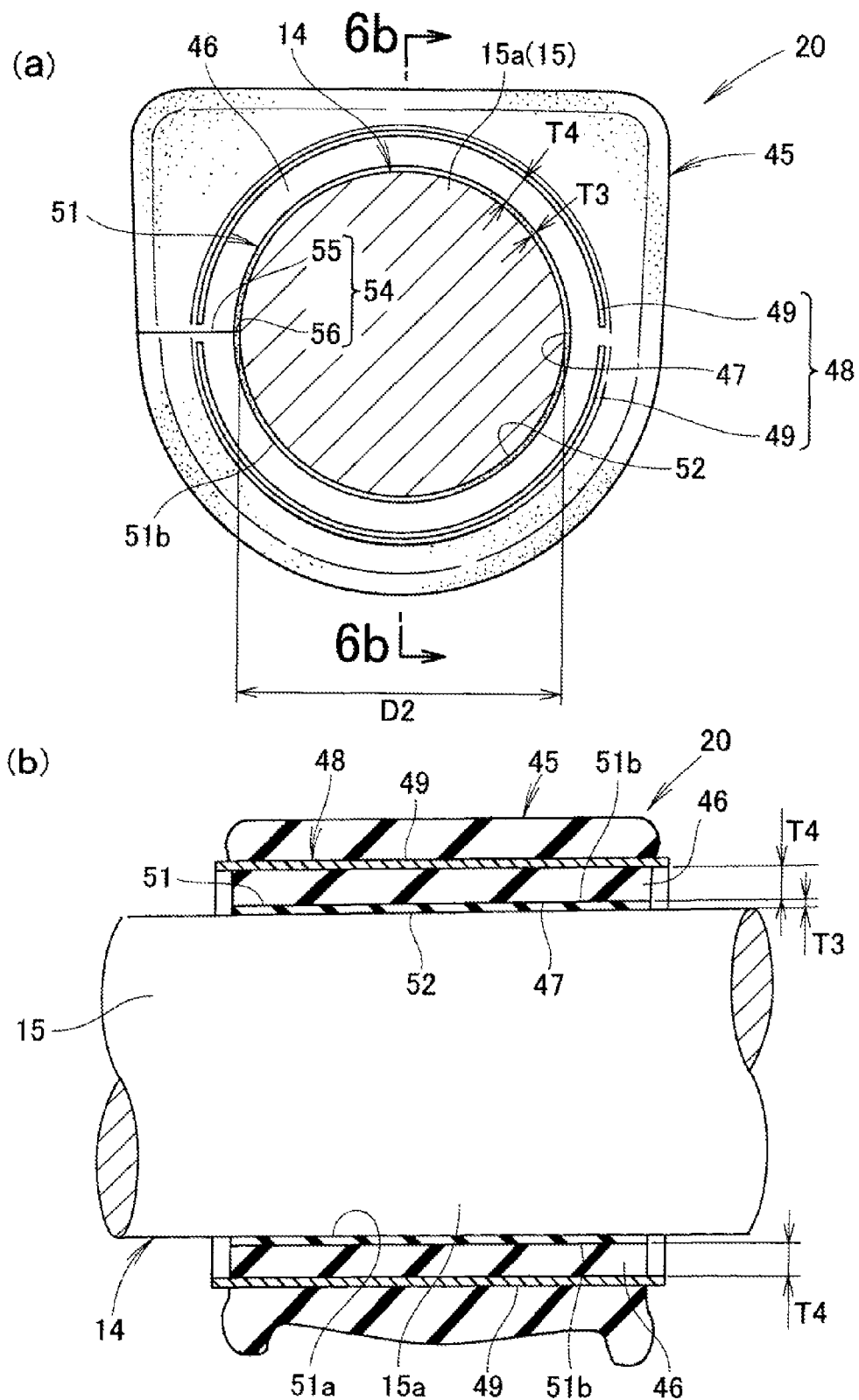
FIG. 6(a) is a front view showing a state in which a stabilizer rod has been inserted through the bush shown in FIG. 5.
FIG. 6(b) is a cross-sectional view taken along line 6b-6b of FIG. 6(a)

As shown in FIG. 5, the inner diameter dimension (i.e., the inner diameter) D1 of the base material 45 is set to be smaller than the outer diameter dimension (i.e., the outer diameter) D2 (see FIG. 6(*a*)) of the left end part 15*a* when the left end part 15*a* of the torsion section 15 (see FIG. 2) is not inserted through the through-hole 52. In addition, the wall thickness T1 of the surface layer 51 is set to be smaller than the wall thickness T2*b* of the base material layer 46 when the left end part 15*a* of the torsion section 15 is not inserted through the through-hole 52. The wall thickness T1 of the surface layer 51 is set to, e.g., 0.5 to 1.0 mm In this left bush 20, the base material 45 and the surface layer 51 are opened in the direction indicated by arrows A to open up the bush slit 54, and the through-hole 52 in the left bush 20 is fitted onto the left end part 15*a* of the torsion section 15 (see FIG. 2). The left end part 15*a* of the torsion section 15 shown in FIG. 2 (i.e., the stabilizer rod 14) is thereby supported in a state of being inserted through the through-hole 52 in the left bush 20.

As shown in FIGS. 6(*a*) and (*b*), the left end part 15*a* of the torsion section 15 (i.e., the stabilizer rod 14) is supported by the through-hole 52 in the surface layer 51. The surface layer 51 is made from self-adhesive butyl rubber. The left end part 15*a* and the surface layer 51 thereby adhere to each other when the left end part 15*a* of the torsion section 15 has been inserted through the through-hole 52 in the surface layer 51.

This makes it possible, when the stabilizer rod 14 is twisted, to cause the surface layer 51 and the base material 45 to integrally deform in a suitable manner so as to track the twisting of the stabilizer rod 14, and impart a reaction force while inhibiting the stabilizer rod 14 from slipping relative to the surface layer 51 (i.e., the left bush 20). Furthermore, because the surface layer 51 and the left end part 15*a* of the torsion section 15 are caused to adhere to each other and the stabilizer rod 14 can be prevented from slipping relative to the surface layer 51, it is possible to improve the sealing performance between the surface layer 51 and the left end part 15*a* of the torsion section 15 and prevent foreign matter such as water droplets, pebbles, mid, and brake dust from entering.

The grounds for setting the wall thickness T1 of the surface layer 51 to 0.5 to 1.0 mm are as follows. If the wall thickness T1 of the surface layer 51 is less than 0.5 mm, it will be more difficult to satisfactorily charge butyl rubber into the cavity of the mold when forming the surface layer 51 by two-color molding.

If, on the other hand, the wall thickness T1 of the surface layer 51 exceeds 1.0 mm, the wall of the surface layer 51 will become excessively thick, the surface layer 51 will have a greater effect on characteristics, and hysteresis will increase. Accordingly, the wall thickness T1 of the surface layer 51 is set to 0.5 to 1.0 mm so that the sealing performance between the surface layer 51 and the left end part 15*a* of the torsion section 15 is improved while preventing the surface layer 51 from affecting the spring characteristics of the stabilizer rod 14. In addition, the surface layer 51 is caused to deform in a suitable manner so as to track the twisting of the torsion section 15 and the left end part 15*a* of the torsion section 15 is inhibited from slipping relative to the surface layer 51 (i.e., the left bush 20), whereby it is possible to minimize wear of the surface of the surface layer 51 that comes into contact with the left end part 15*a* (i.e., the inner circumferential surface of the surface layer 51).

As shown in FIGS. 6(*a*) and (*b*), the wall thickness T4 of the base material layer 46 is set to be larger than the wall thickness T3 of the surface layer 51 when the left end part 15*a* of the torsion section 15 (i.e., the stabilizer rod 14) has been inserted through the through-hole 52. In addition, as described above, the wall thickness T1 of the surface layer 51 (see FIG. 5) is set to be smaller than the wall thickness T2*b* of the base material layer 46 (see FIG. 5) when the left end part 15*a* of the torsion section 15 is not inserted through the through-hole 52.

The amount of compression δ1 in the base material 45 (i.e., the base material layer 46) is set to be larger than the amount of compression δ2 in the surface layer 51 when the left end part 15*a* of the torsion section 15 (i.e., the stabilizer rod 14) has been inserted through the through-hole 52. The amount of compression δ1 in the base material layer 46 is the difference between the wall thickness T2*b* when the torsion section 15 (i.e., the left end part 15*a*) is not inserted (as shown in FIG. 4) and the wall thickness T4 when the left end part 15*a* has been inserted, i.e., T2*b* -T4. The amount of compression δ2 in the surface layer 51 is the difference between the wall thickness T1 when the torsion section 15 (i.e., the left end part 15*a*) is not inserted (as shown in FIG. 4) and the wall thickness T3 when the left end part 15*a* has been inserted, i.e., T1-T3.

The natural rubber forming the base material 45 exhibits excellent spring characteristics. Meanwhile, the butyl rubber forming the surface layer 51 exhibits excellent characteristics in terms of self-adhesiveness and adhesiveness. Setting an even larger wall thickness T1 for the surface layer 51 will result, when the torsion section 15 (i.e., the left end part 15*a*) is inserted through the through-hole 52, in an increase in the amount of compression δ2 in the surface layer 51 and an insufficient amount of compression δ1 in the base material 45 (i.e., the base material layer 46), hindering the inherent characteristics (i.e., the spring characteristics) of the base material 45 from being exploited.

Accordingly, the inner diameter dimension (i.e., the inner diameter) D1 of the base material 45 (see FIG. 5) is set to be smaller than the outer diameter dimension (i.e., the outer diameter) D2 of the left end part 15*a* (see FIG. 6(*a*)). It is thereby possible to obtain a suitable amount of compression δ1 in the base material layer 46, allowing the inherent characteristics (i.e., the spring characteristics) of the base material 45 to be exploited. The base material 45 is thereby able, when the left arm section 16 shown in FIG. 2 moves (i.e., swings) vertically in the direction indicated by arrow B and the torsion section 15 is twisted, to apply a restoring force in a suitable manner. It is further preferable for the surface layer 51 to be harder than the base material 45 so that the amount of compression δ1 in the base material 45 is larger than the amount of compression δ2 in the surface layer 51.

The inter-ring 48 is positioned around the opening 47 in the base material 45 so that the opening 47 is enclosed by the inter-ring 48, and the base material layer 46 is provided inside the inter-ring 48. This makes it possible for the base material 45 to be supported by the inter-ring 48, and the base material 45 being supported by the inter-ring 48 makes it possible to suppress strain in the base material 45. Suppressing the strain in the base material 45 makes it possible, when the stabilizer rod 14 (i.e., the torsion section 15) is twisted, to maintain a gap in a stable manner between the base material 45 and the torsion section 15.

This makes it possible to prevent a further gap (i.e., space) from forming between the stabilizer rod 14 and the surface layer 51 and more effectively prevent the stabilizer rod 14 from slipping relative to the surface layer 51. Accordingly, the sealing performance between the stabilizer rod 14 and the surface layer 51 can be further improved.

Figure 7:
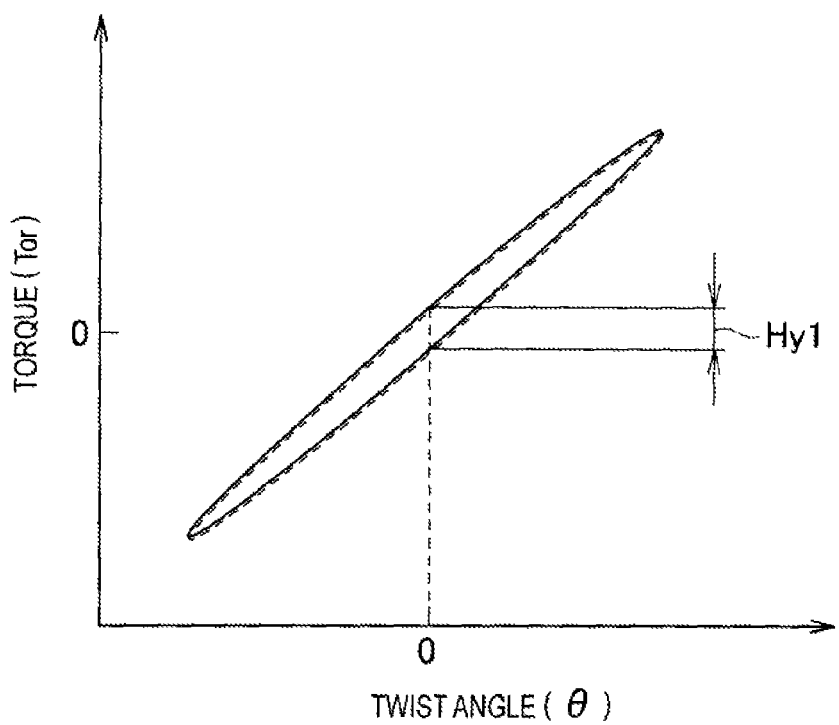
FIG. 7(a) is a graph illustrating the hysteresis in the bush in the first embodiment and the hysteresis in a conventional bush at room temperature.
FIG. 7(b) illustrates the hysteresis in the bush in the first embodiment and the hysteresis in a conventional bush in a hot state.
Figure 7:
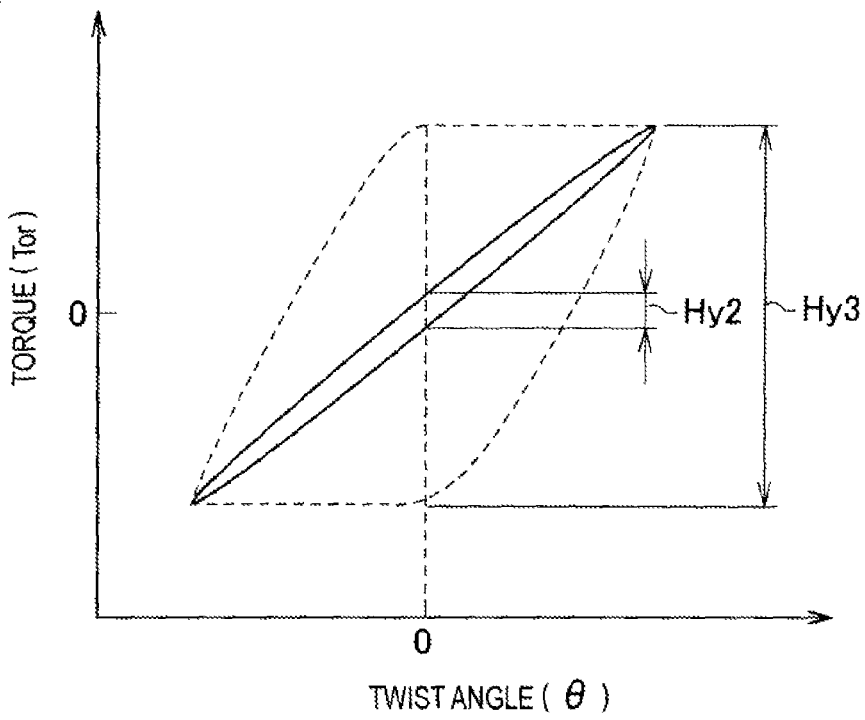

FIG. 7(a) is a graph illustrating the hysteresis in the left bush 20 in the first embodiment and the hysteresis in a conventional bush at room temperature; and FIG. 7(b) illustrates the hysteresis in the left bush 20 in the first embodiment and the hysteresis in a conventional bush in a hot state at 80° C. The left bush 20 in the first embodiment is indicated, as an embodiment, by solid lines and the conventional bush is indicated, as a comparative example, by dashed lines. The comparative example is a bush that does not include the surface layer 51 in the first embodiment. The vertical axis represents the torque Tor generated by the stabilizer rod 14 (i.e., the torsion section 15) being twisted, and the horizontal axis represents the twist angle θ of the stabilizer rod 14.

It can be seen in FIG. 7(a) that in the first embodiment and the comparative example, at room temperature, when the twist angle θ of the stabilizer rod 14 is zero, the hysteresis (i.e., the difference in the generated torque) is kept small as indicated by Hy1. It can be seen in FIG. 7(b) that in the first embodiment, in a hot state, when the twist angle θ of the stabilizer rod 14 is zero, the hysteresis is kept small as indicated by Hy2. In contrast, in the comparative example, in a hot state, it can be seen that when the twist angle θ of the stabilizer rod 14 is zero, the hysteresis is larger as indicated by Hy3.

Thus, it can be seen that using the left bush 20 in the first embodiment results in the hysteresis Hy1 being kept small at room temperature as shown in FIG. 7(a) and the hysteresis Hy2 being kept small in a hot state shown in FIG. 7(b). It can be seen that the left bush 20 in the first embodiment can thereby be imparted with spring characteristics, allowing the left bush 20 to effectively apply a reaction torque that remains stable in response to a change in input load or the direction in which the stabilizer rod 14 is twisted.

Figure 8:
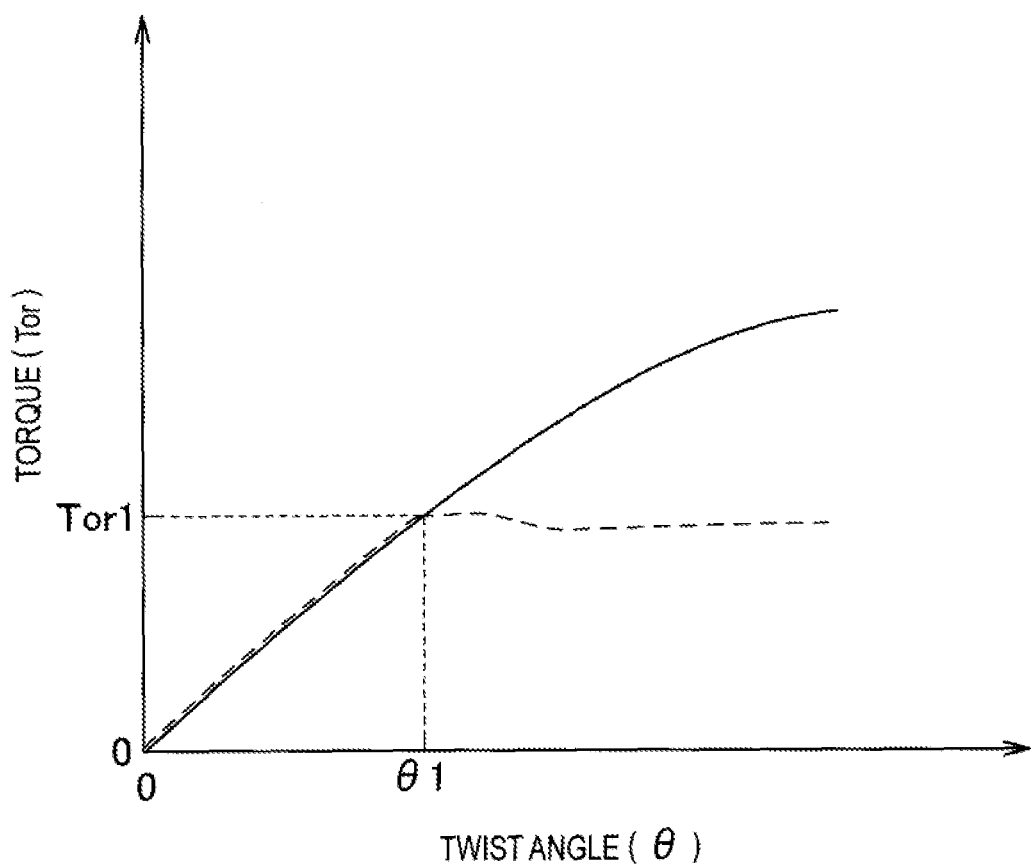
FIG. 8 is a graph illustrating a slippage state in the bush in the first embodiment and a slippage state in a conventional bush in a hot state
Figure 9:
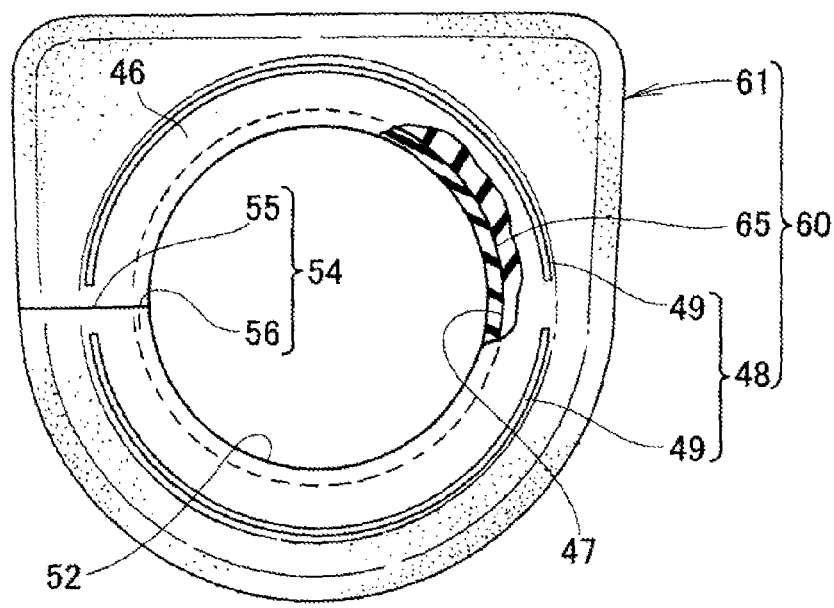
FIG. 9(a) is a front view of a bush according to a second embodiment of the present invention.
FIG. 9(b) is a cross-sectional view taken along line 9b-9b of FIG. 9(a)
Figure 9:
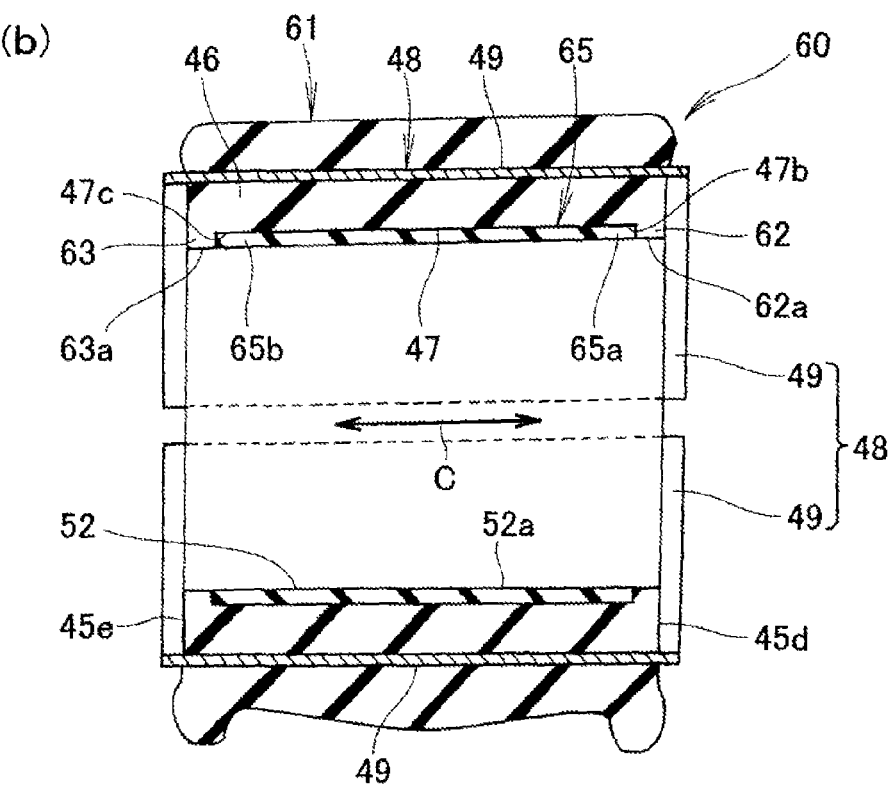
Figure 10:
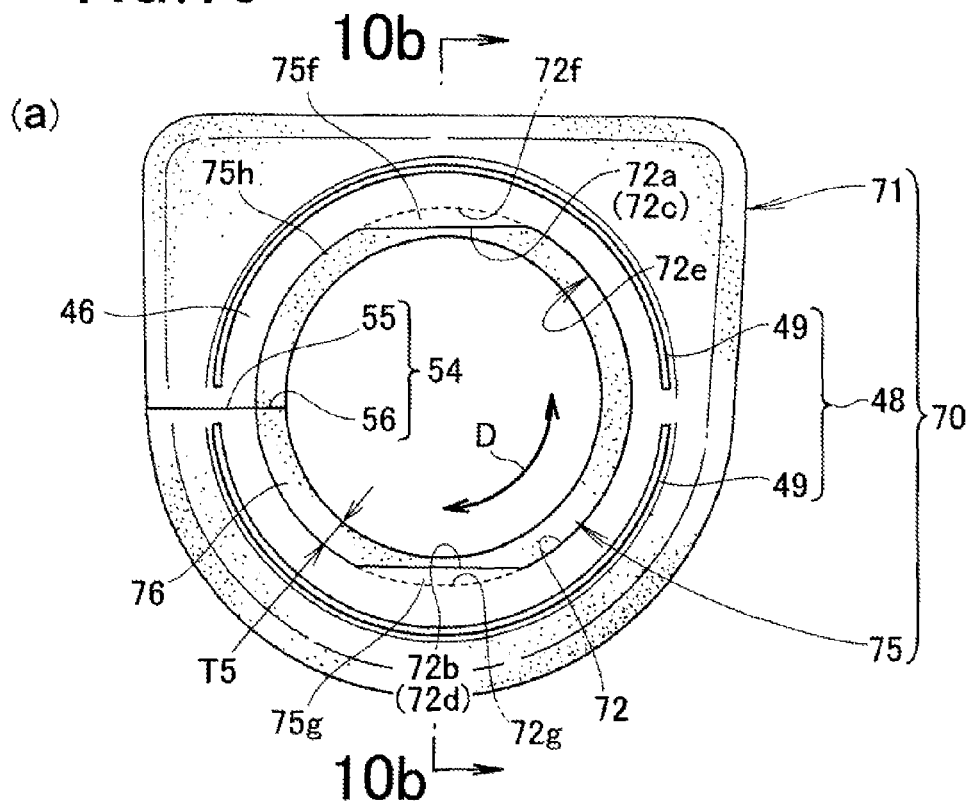
FIG. 10(a) is a front view of a bush according to a third embodiment of the present invention.
FIG. 10(b) is a cross-sectional view taken along line 10b-10b of FIG. 10(a)
Figure 10:
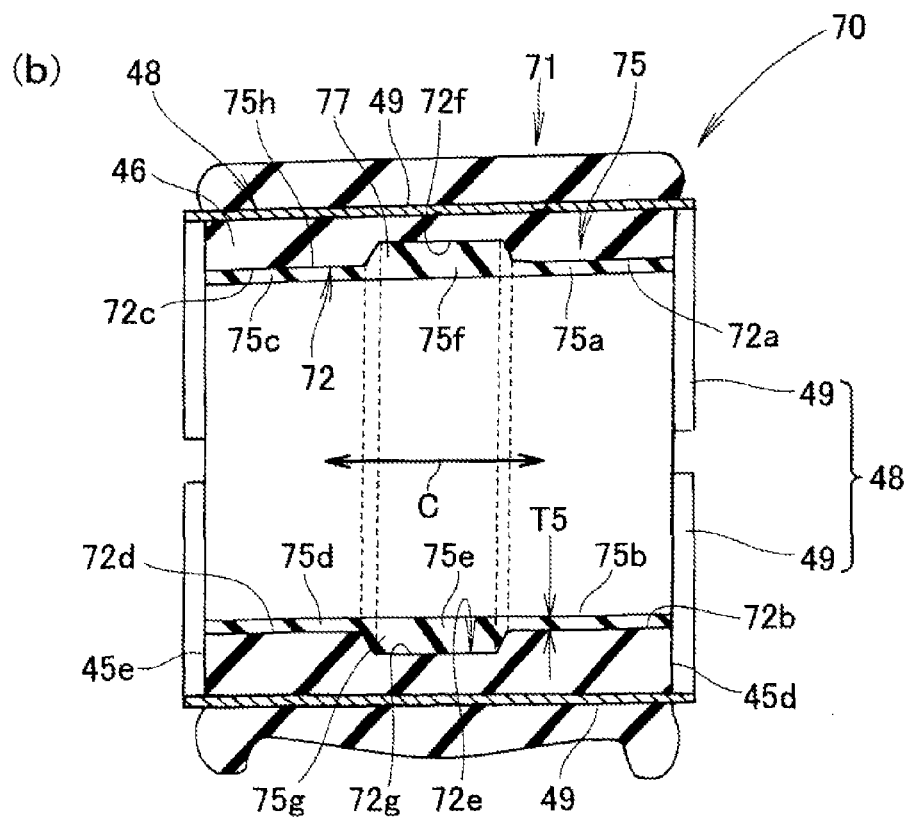

FIG. 8 is a graph illustrating the slippage state in the left bush 20 in the first embodiment and the slippage state in a conventional bush in a hot state at 80° C. The left bush 20 of the first embodiment is indicated by a solid line and the conventional bush is represented by a dashed line. The vertical axis represents the torque Tor generated by the stabilizer rod 14 (i.e., the torsion section 15) being twisted, and the horizontal axis represents the twist angle θ of the stabilizer rod 14.

As shown in FIG. 8, in the first embodiment in a hot state, the torque Tor gradually increases in a linear shape with an increase in the twist angle θ of the stabilizer rod 14 (i.e., the torsion section 15). Accordingly, it can be seen that the stabilizer rod 14 and the left bush 20 (i.e., the surface layer 51) are kept from slipping relative to each other.

In the comparative example in the hot state, the torque Tor saturates at a predetermined value Tor1 when the twist angle θ of the stabilizer rod 14 (i.e., the torsion section 15) exceeds θ1. Accordingly, it can be seen that the stabilizer rod 14 and the left bush 20 (i.e., the surface layer 51) slip against each other when the twist angle θ0 exceeds θ1.

In other words, it can be seen that because the left bush 20 includes a surface layer 51 formed from butyl rubber, when the stabilizer rod 14 is twisted, the surface layer 51 and the base material 45 are able to integrally deform in a suitable manner so as to track the twisting of the stabilizer rod 14, and the left bush 20 is able to impart a reaction force in a stable manner across a wide torque range while the stabilizer rod 14 is inhibited from slipping relative to the surface layer 51 (i.e., the left bush 20).

Next, bushes according to second to ninth embodiments will be described with reference to FIGS. 9 to 16. In each of the bushes according to the second to ninth embodiments, members that are the same as those in the left bush 20 in the first embodiment are affixed with the same numerals and a description shall not be provided.

[Second Embodiment]

As shown in FIGS. 9(a) and (b), a bush 60 according to the second embodiment is configured so that two axial ends 65a, 65b of the surface layer 65 are blocked by the base material 61; other configurations of the bush 60 are identical to those of the left bush 20 in the first embodiment.

In the base material 61, one projecting section 62 protrudes from one end part 47b of the opening 47 towards the surface layer 65, and another projecting section 63 protrudes from the other end part 47c of the opening 47 towards the surface layer 65; other configurations of the base material 61 are identical to those of the base material 45 in the first embodiment. Each of the one projecting section 62 and the other projecting section 63 is formed annularly, and respective distal end parts 62a, 63a (of the projecting sections) are exposed beyond the surface layer 65. Accordingly, the distal end parts 62a, 63a abut against the left end part 15a when the left end part 15a of the torsion section 15 (see FIG. 2) is inserted through the through-hole 52.

In the surface layer 65, one end 65a of the surface layer 65 abuts against the one projecting section 62 and the other end 65b of the surface layer 65 abuts against the other projecting section 6; other configurations of the surface layer 65 are identical to those of the surface layer 51 in the first embodiment.

Causing the one end 65a of the surface layer 65 to abut against the one projecting section 62 and the other end 65b of the surface layer 65 to abut against the other projecting section 63 makes it possible to block the one end 65a or the other end 65b of the surface layer 65 from moving axially outwards from the opening 47 (i.e., in the directions indicated by arrow C).

As described above, in the bush 60 according to the second embodiment, blocking the two axial ends 65a, 65b of the surface layer 65 using the base material 61 makes it possible to inhibit the surface layer 65 from displacing or flowing in the axial direction (i.e., in the directions indicated by arrow C). This makes it possible to minimize wear in the inner circumferential surface of the surface layer 65 that comes into contact with the left end part 15a of the torsion section 15 (i.e., the inner circumferential surface of the through-hole 52) (see FIG. 2), allowing the durability of the bush 60 to be increased.

Inhibiting the surface layer 65 from displacing or flowing in the axial direction (i.e., the directions indicated by arrow C) makes it possible to maintain, in a stable manner, the surface layer 65 in a predetermined shape. Accordingly, the characteristics of the surface layer 65 (i.e., self-adhesiveness and adhesiveness) can be suitably exploited. It is thereby possible to improve, e.g., the sealing performance between the surface layer 65 and the left end part 15a of the torsion section 15 (see FIG. 2).

[Third Embodiment]

As shown in FIGS. 10(a) and (b), a bush 70 according to a third embodiment is configured so that the wall thickness T5 of the surface layer 75 is varied around the circumference (i.e., around the direction indicated by arrow D) and varied along the axial direction (i.e., along the direction indicated by arrow C); other configurations of the bush 70 are identical to those of the left bush 20 in the first embodiment.

The base material 71 only differs from the base material 45 in the first embodiment in that the shape of the opening 72 in the base material 71 differs from that of the opening 47 in the first embodiment; other configurations of the base material 71 are identical to those of the base material 45 in the first embodiment. The opening 72 has, on the inner circumferential surface, a first upper flat surface 72a and a first lower flat surface 72b formed flat at the side of one end, a second upper flat surface 72c and a second lower flat surface 72d formed flat at the side of the other end, and a central circumferential surface 72e formed in a circular shape at the center.

The first upper flat surface 72a and the first lower flat surface 72b are respectively provided to the upper end and the lower end at the side of the one end of the opening 72. The second upper flat surface 72c and the second lower flat surface 72d are respectively provided to the upper end and the lower end at the side of the other end of the opening 72. The central circumferential surface 72e is formed at the center of the opening 72 so as to have a circular inner circumferential surface.

As a result, the upper end 72f of the central circumferential surface 72e is formed so as to indent upwards relative to the first upper flat surface 72a and the second upper flat surface 72c. The lower end 72g of the central circumferential surface 72e is formed so as to indent downwards relative to the first lower flat surface 72b and the second lower flat surface 72d.

The surface layer 75 is provided to the inner circumferential surface of the opening 72 and thereby configured so that the wall thickness T5 varies around the circumferential direction (i.e., the direction indicated by arrow D) and along the axial direction (i.e., the direction indicated by arrow C); other configurations of the surface layer 75 are identical to those of the surface layer 51 in the first embodiment.

Specifically, the surface layer 75, through being provided to the inner circumferential surface of the opening 72, has a first upper flat surface layer 75a and a first lower flat surface layer 75b formed flat at the side of one end, a second upper flat surface layer 75c and a second lower flat surface layer 75d formed flat at the side of the other end, and a central circumferential surface layer 75e formed in a circular shape at the center.

The first upper flat surface layer 75a, the first lower flat surface layer 75b, the second upper flat surface layer 75c, and the second lower flat surface layer 75d have a wall thickness T5 smaller than that of other portions of the surface layer 75. As a result, the wall thickness T5 of the surface layer 75 can be varied around the circumferential direction (i.e., the direction indicated by arrow D). The upper end 75f and the lower end 75g of the annularly formed central circumferential surface layer 75e have a wall thickness T5 larger than that of the first upper flat surface layer 75a, the first lower flat surface layer 75b, the second upper flat surface layer 75c, and the second lower flat surface layer 75d. As a result, the wall thickness T5 of the surface layer 75 can be varied along the axial direction (i.e., along the direction indicated by arrow C).

In the bush 70 according to the third embodiment, varying the wall thickness T5 of the surface layer 75 around the circumferential direction (i.e., the direction indicated by arrow D) makes it possible to obtain, in the circumferential direction of the surface layer 75, a first thick-walled part 76 in which the surface layer 75 has a larger wall thickness T5. In addition, varying the wall thickness T5 of the surface layer 75 along the axial direction (i.e., the direction indicated by arrow C) makes it possible to obtain, in the axial direction of the surface layer 75, a second thick-walled part 77 in which the surface layer 75 has a larger wall thickness T5.

This makes it possible to dissipate the stress (i.e., load), generated in the surface layer 75 by the left end part 15a of the torsion section 15 (see FIG. 2) being twisted, into the first thick-walled part 76 and the second thick-walled part 77. In addition, load generated in the surface layer 75 when, e.g., the bush 70 is fastened with the left mounting bracket 23 to the vehicle body, can be effectively dispersed into the first thick-walled part 76 and the second thick-walled part 77 and suitably alleviated inside the surface layer 75.

This makes it possible to suitably adjust the surface pressure acting on the opening 72 of the base material 71 from the surface layer 75 and exploit the spring characteristics of the base material 71 in a stable manner. Suitably adjusting the surface pressure acting on the opening 72 of the base material 71 from the surface layer 75 makes it possible to prevent a large load from acting on the interface 75h and increase the durability of the bush 70. In addition, effectively dispersing the load generated in the surface layer 75 into the first thick-walled part 76 and the second thick-walled part 77 makes it possible to inhibit the surface layer 75 from suffering a localized permanent set in fatigue or an elastic deformation.

Providing a large first thick-walled part 76 around the circumferential direction of the surface layer 75 (i.e., the direction indicated by arrow D) and providing the second thick-walled part 77 along the axial direction of the surface layer 75 (i.e., the direction indicated by arrow C) make it possible to increase the durability against a torsional load acting in the circumferential direction (i.e., the direction indicated by arrow D) or a load acting in the axial direction (i.e., the direction indicated by arrow C).

[Fourth Embodiment]

Figure 11:
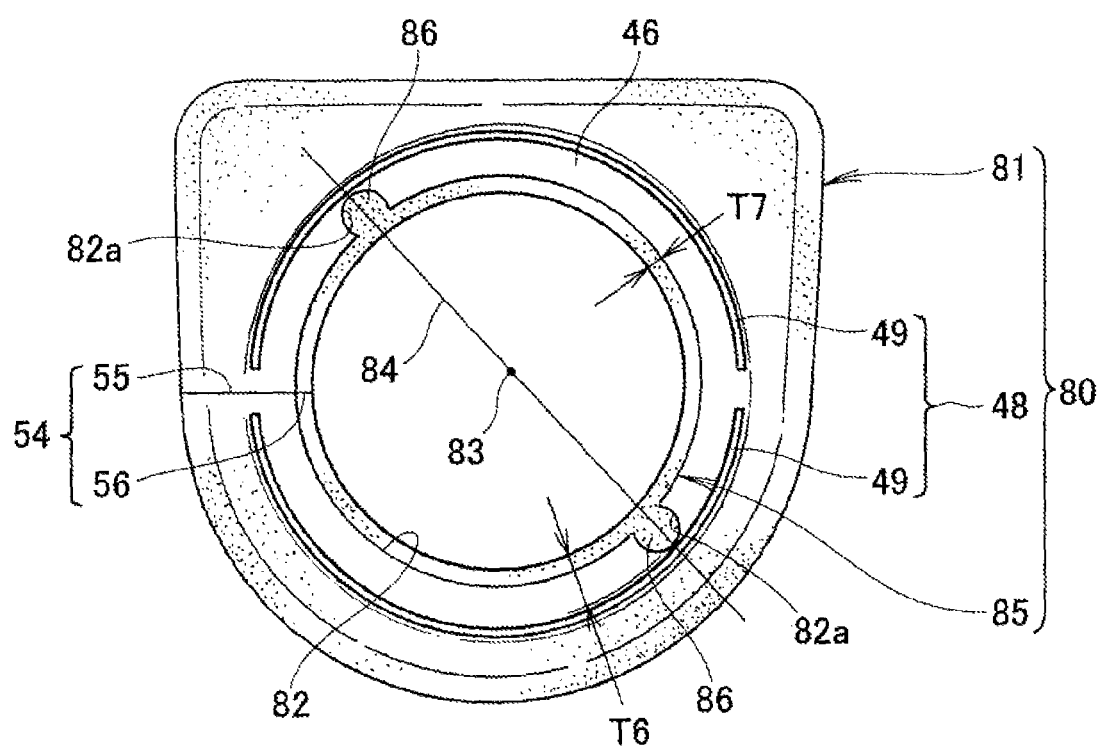
FIG. 11 is a front view of a bush according to a fourth embodiment of the present invention.
Figure 12:
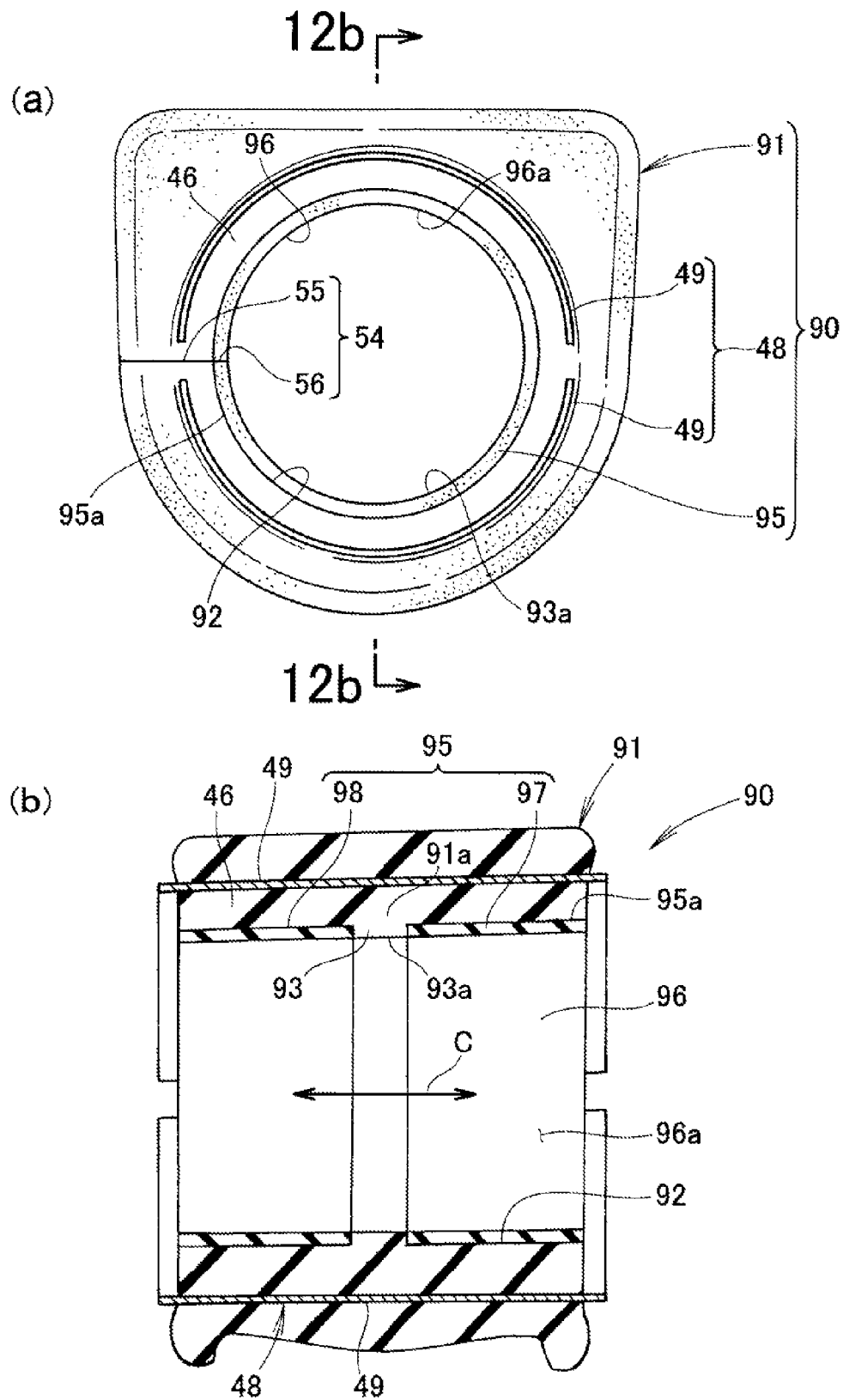
FIG. 12(a) is a front view of a bush according to a fifth embodiment of the present invention.
FIG. 12(b) is a cross-sectional view taken along line 12b-12b of FIG. 12(a)
Figure 13:
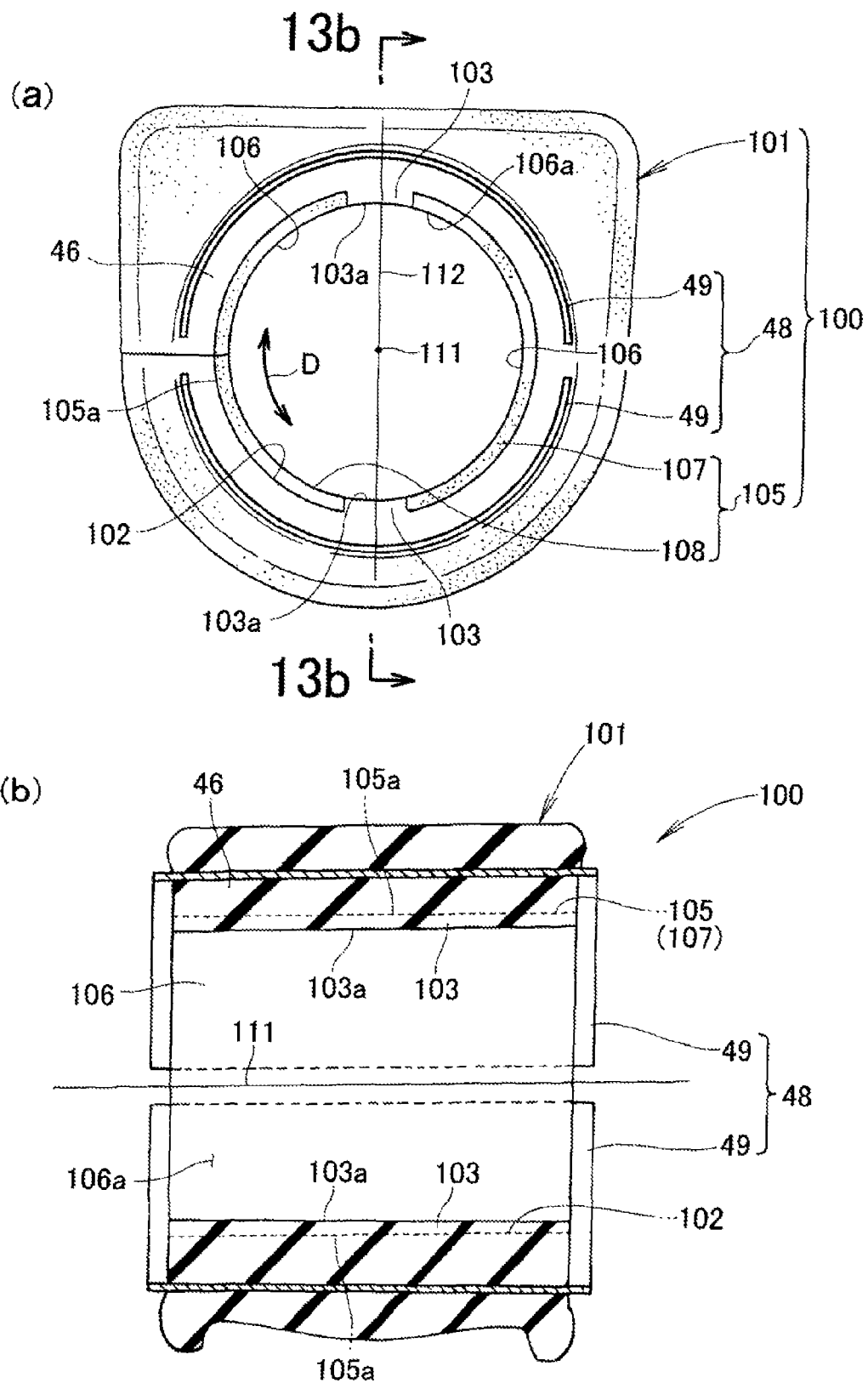
FIG. 13(a) is a front view of a bush according to a sixth embodiment of the present invention.
FIG. 13(b) is a cross-sectional view taken along line 13b-13b of FIG. 13(a)

As shown in FIG. 11, a bush 80 according to a fourth embodiment is configured so that a pair of thick-walled parts 86 having a large wall thickness T6 is formed in parts of the surface layer 85, it being possible to inject butyl rubber in a molten state from the thick-walled parts 86; other configurations of the bush 80 are identical to those of the left bush 20 in the first embodiment.

In order to form the thick-walled parts 86 in the surface layer 85, a pair of recesses 82a is formed in the opening 82 in the base material 81 so as to face each other and so as to avoid the slit 54 and the upper and lower edges of the bush 80 which represents the fastening direction. In the base material 81, a pair of the recesses 82a is formed in the opening 82; other configurations of the base material 81 are identical to those of the base material 45 in the first embodiment. The recesses 82a are provided on an extension line intersecting the axial line 83 of the opening 82, and are extended parallel to the axial line 83 along the inner circumferential wall of the opening 82.

Forming the surface layer 85 integrally on the inner circumferential wall of the opening 82 makes it possible to form the thick-walled parts 86 in the surface layer 85. Forming the thick-walled parts 86 in the surface layer 85 makes it possible to inject butyl rubber in a molten state from the thick-walled parts 86.

In the bush 80 according to the fourth embodiment, providing the surface layer 85 with at least one thick-walled part 86, from which butyl rubber can be injected in a molten state, makes it possible to further reduce the wall thickness T7 of the surface layer 85. As a result, when a vibration in the direction indicated by arrow B (see FIG. 2) transmitted into the stabilizer rod 14 from the road surface causes the torsion section 15 to twist, the twist in the torsion section 15 can be effectively transmitted through the surface layer 85 into the base material 81. This makes it possible to exploit the spring characteristics of the bush 80.

[Fifth Embodiment]

As shown in FIGS. 12(a) and (b), a bush 90 according to a fifth embodiment is configured so that an annular protrusion 93 is provided in the opening 92 in the base material 91, and the surface layer 95 is divided in the axial direction (i.e., the direction indicated by arrow C) by the annular protrusion 93; other configurations of the bush 90 are identical to those of the left bush 20 in the first embodiment.

The base material 91 has the annular protrusion 93 in the opening 92; other configurations of the base material 91 are identical to those of the base material 45 in the first embodiment. The opening 92 has the protrusion 93 protruding towards the surface layer 95 from a part 91a of the base material 91 at the center with respect to the axial line direction (i.e., the axial direction, which is indicated by arrow C). The protrusion 93 protrudes annularly from the inner circumferential wall of the opening 92 towards the surface layer 95 so that the annular distal end part 93a is exposed beyond the inner circumferential surface 96a of the surface layer 95 (i.e., of the through-hole 96).

Accordingly, the distal end part 93a of the protrusion 93 abuts against the left end part 15a of the torsion section 15 (see FIG. 2) when the left end part 15a has been inserted through the through-hole 96 in the surface layer 95. As a result, the surface layer 95 is formed so as to be divided into a first surface layer 97 on one side of the protrusion 93 in the axial line direction (i.e., the direction indicated by arrow C), and a second surface layer 98 on the other side of the protrusion 93 in the axial line direction (i.e., the direction indicated by arrow C). Each of the first surface layer 97 and the second surface layer 98 is an annularly formed surface layer.

As described above, in the bush 90 according to the fifth embodiment, the surface layer 95 is divided by the protrusion 93 into the first surface layer 97 and the second surface layer 98. As a result, when a vibration in the direction indicated by arrow B (see FIG. 2) transmitted into the stabilizer rod 14 from the road surface causes the torsion section 15 to twist, the stress (i.e., load) generated in the surface layer 95 by the torsion section 15 twisting can be dispersed into the divided first surface layer 97 and second surface layer 98, minimizing the deformation in the surface layer 95.

It is thereby possible to minimize the load occurring on the interface 95a at which the surface layer 95 (i.e., the first surface layer 97 and the second surface layer 98) is joined to the base material 91. This allows the join between the interface 95a of the surface layer 95 and the base material 91 to be made more stable, making it possible to increase the durability of the bush 90.

[Sixth Embodiment]

As shown in FIGS. 13(a) and (b), a bush 100 according to a sixth embodiment is configured so that a pair of protrusions 103 is formed in the opening 102 in the base material 101 and the surface layer 105 is divided by the protrusions 103 in the circumferential direction (i.e., the direction indicated by arrow D); other configurations of the bush 100 are identical to those of the left bush 20 in the first embodiment.

The base material 101 has a pair of protrusions 103 in the opening 102; other configurations of the base material 101 are identical to those of the base material 45 in the first embodiment. The protrusions 103 are provided on an extension line 112 intersecting the axial line 111 of the opening 102, and are linearly extended parallel to the axial line 111 along the inner circumferential wall of the opening 102. Each of the protrusions 103 protrudes from the inner circumferential wall of the opening 102 towards the surface layer 105 so that the distal end part is exposed beyond the inner circumferential surface 106a of the surface layer 105 (through-hole 106).

Accordingly, the distal end part 103a of each of the protrusions 103 abuts against the left end part 15a of the torsion section 15 (see FIG. 2) when the left end part 15a is inserted through the through-hole 106 of the surface layer 105. As a result, the surface layer 105 is formed so as to be divided in the circumferential direction (i.e., the direction indicated by arrow D) by the protrusions 103 into a first surface layer 107 and a second surface layer 108. Each of the first surface layer 107 and the second surface layer 108 is a surface layer formed into a semi-arcuate shape.

As described above, in the bush 100 according to the sixth embodiment, the surface layer 105 is divided by the protrusions 103 into the first surface layer 107 and the second surface layer 108. As a result, when a vibration in the direction indicated by arrow B (see FIG. 2) transmitted into the stabilizer rod 14 from the road surface causes the torsion section 15 to twist, the stress (i.e., load) generated in the surface layer 105 by the torsion section 15 being twisted can be dispersed into the divided first surface layer 107 and second surface layer 108, minimizing the deformation in the surface layer 105.

It is thereby possible to minimize the load occurring on the interface 105a at which the surface layer 105 (i.e., the first surface layer 107 and the second surface layer 108) is joined to the base material 101. This allows the join between the interface 105a of the surface layer 105 and the base material 101 to be made more stable, making it possible to increase the durability of the bush 100.

[Seventh Embodiment]

Figure 14:
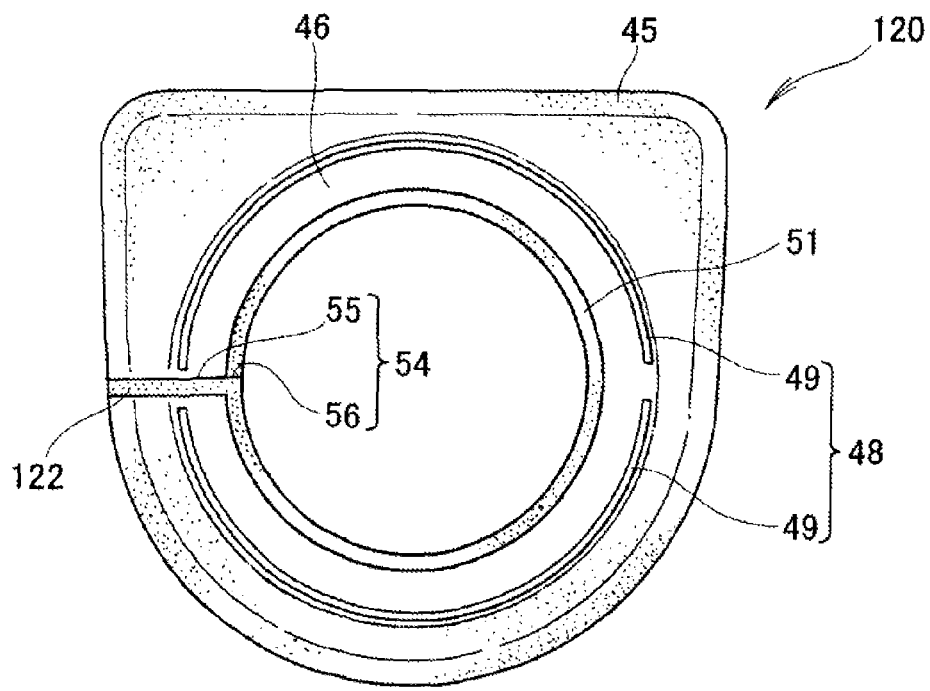
FIG. 14 is a front view of a bush according to a seventh embodiment of the present invention.

As shown in FIG. 14, in a bush 120 according to a seventh embodiment, the bush slit 54 in the base material 45 includes a sealing material 122; other configurations of the bush 120 are identical to those of the left bush 20 in the first embodiment.

The sealing material 122 is formed by two-color molding, integrally with the base material 45 and the surface layer 51, so as to extend from the surface layer 51, using butyl rubber as with the surface layer 51. As described above, butyl rubber exhibits a high adhesiveness (tack). As a result, packing (i.e., molding) the sealing material 122 in the bush slit 54 makes it possible to cause the bush slit 54 to stick in a satisfactory manner due to the sealing material 122. This makes it possible for water to be prevented by the sealing material 122 from entering the bush slit 54 by, e.g., capillary action, and for the sealing performance between the surface layer 51 and the left end part 15a of the torsion section 15 (see FIG. 2) to be further improved.

[Eighth embodiment]

Figure 15:
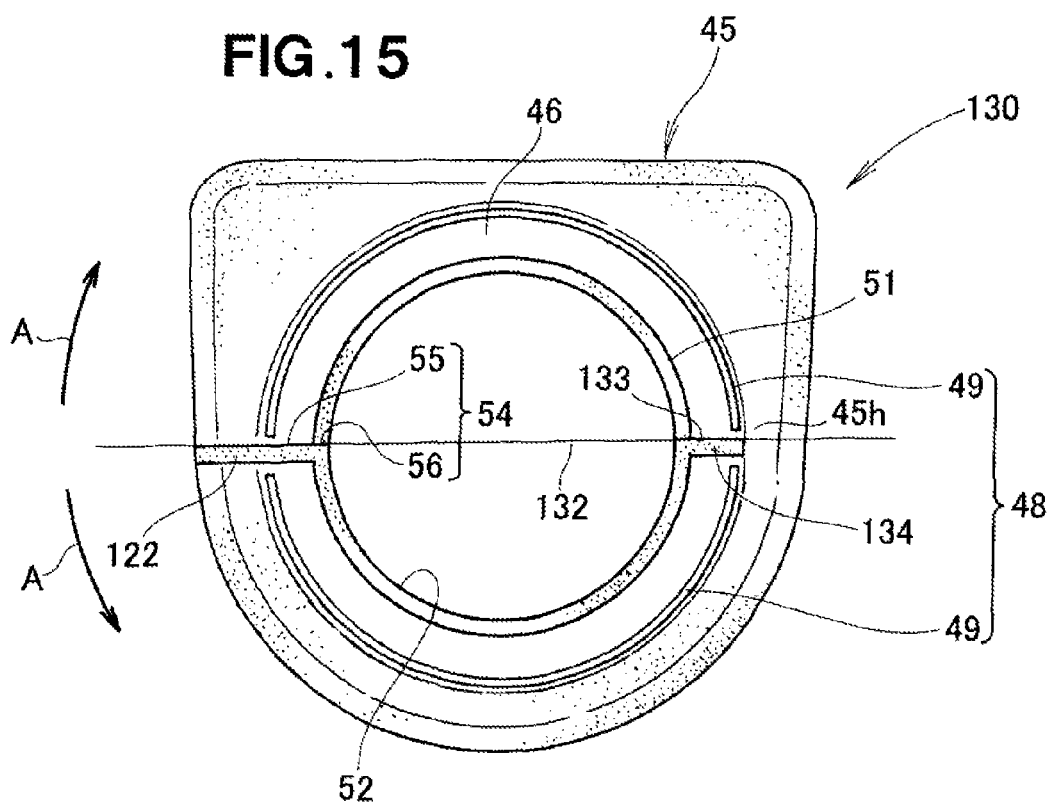
FIG. 15 is a front view of a bush according to an eighth embodiment of the present invention.

As shown in FIG. 15, in a bush 130 according to an eighth embodiment, a sub-slit 133 is formed on an extension line 132 of the bush slit 54, and a sub-sealing material 134 is provided to the sub-slit 133; other configurations of the bush 130 are identical to those of the bush 120 in the seventh embodiment.

The sub-slit 133 is formed in a straight line, on the extension line 132 of the bush slit 54, from the surface layer 51 to a portion 45h partway within the base material 45. Forming the sub-slit 133 in the bush 130 allows the base material 45 and the surface layer 51 to be adequately opened up in the directions indicated by arrows A. This makes it even easier for the through-hole 52 in the bush 130 to be fitted onto the left end part 15a of the torsion section 15 (see FIG. 2).

The sub-sealing material 134 is formed by two-color molding integrally with the base material 45 and the surface layer 51 so as to extend from the surface layer 51, using butyl rubber as with the sealing material 122 and the surface layer 51. Thus packing (i.e., molding) the sub-sealing material 134 in the sub-slit 133 makes it possible to cause the sub-slit 133 to stick in a satisfactory manner due to the sub-sealing material 134. This makes it possible for water to be prevented by the sub-sealing material 134 from entering the sub-slit 133 by, e.g., capillary action, and for an adequate sealing performance to be obtained between the surface layer 51 and the left end part 15a of the torsion section 15 (see FIG. 2).

[Ninth Embodiment]

Figure 16:
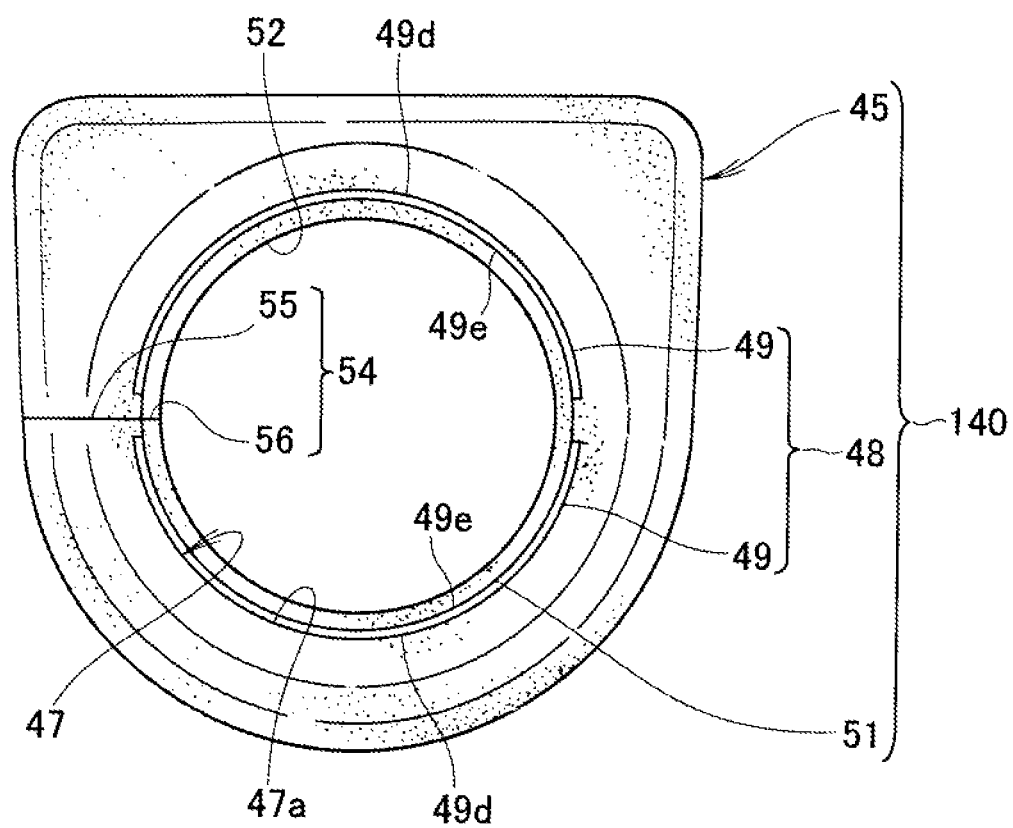
FIG. 16 is a front view of a bush according to a ninth embodiment of the present invention.

As shown in FIG. 16, in a bush 140 according to a ninth embodiment, the outer circumferential surface of the inter-ring 48 is provided so as to be in contact with the inner circumferential surface 47a of the opening 47, and the surface layer 51 is integrally provided on the inner circumferential surface of the inter-ring 48; other configurations of the bush 140 are identical to those of the left bush 20 in the first embodiment.

The outer circumferential surface of the inter-ring 48 is formed from the respective outer circumferential surfaces 49d of the upper half-split link part 49 and the lower half-split link part 49. The inner circumferential surface of the inter-ring 48 is formed from the respective inner circumferential surfaces 49e of the upper half-split link part 49 and the lower half-split link part 49.

The inter-ring 48 is brought into contact with the inner circumferential surface 47a of the opening 47, and the annular surface layer 51 is integrally provided on the inner circumferential surface of the inter-ring 48 (i.e., the inner circumferential surfaces 49e of the upper and lower half-split link parts 49). Thus bringing the inter-ring 48 into contact with the inner circumferential surface 47a of the opening 47 allows the base material 45 (i.e., the opening 47) to be inhibited by the inter-ring 48 from deforming.

This allows the stress (i.e., load) generated in the surface layer 51 by the stabilizer rod 14 (see FIG. 2) being twisted to be satisfactorily dispersed throughout the entirety of the opening 47. It is thereby possible to prevent the surface pressure, which is applied by the load generated in the surface layer 51, from being uneven around the opening 47, and allow the stabilizer rod 14 to be supported by the base material 45 in a stable manner.

Bringing the inter-ring 48 into contact with the opening 47 makes it possible for the surface layer 51 to be integrally provided directly on the inner circumferential surface of the inter-ring 48 (i.e., the inner circumferential surfaces 49e of the upper and lower half-split link parts 49). The dimensional precision of the inner circumferential surface of the inter-ring 48 (i.e., the inner circumferential surfaces 49e of the upper and lower half-split link parts 49), which is a metal member, can be enhanced. As a result, directly providing the surface layer 51 on the inner circumferential surface of the inter-ring 48 (i.e., the inner circumferential surfaces 49e of the upper and lower half-split link parts 49) makes it possible to further enhance the dimensional precision of the through-hole 52 provided to the surface layer 51.

The bush according to the present invention is not limited to the above embodiments and may be modified or improved as appropriate. For example, in the first through ninth embodiments above, descriptions were given for examples in which a stabilizer rod supporting structure 10 is applied to a strut-type suspension device. However, this is not provided by way of limitation, and the stabilizer rod supporting structure 10 may be applied to a suspension device of an arbitrary format.

In addition, in the first through ninth embodiments, descriptions were given for examples in which the left and right arm sections 16, 17 of the stabilizer rod 14 are connected to the damper 31. However, this is not provided by way of limitation, and the left and right arm sections 16, 17 may be connected to a knuckle or a suspension arm.

In addition, in the first through ninth embodiments, descriptions were given for examples in which the left and right bushes 20, 21 are mounted by the left and right mounting brackets 23, 24 on the body frame 12 from below. However, this is not provided by way of limitation, and the left and right bushes 20, 21 may be mounted on the body frame 12 from above.

In addition, in the third embodiment, a description was given for an example in which the thickness of the surface layer 75 is varied around the circumferential direction as well as varied along the axial direction. However, this is not provided by way of limitation. For example, the thickness of the surface layer 75 may be varied around the circumferential direction only or along the axial direction only.

In the fourth embodiment, a description was given for an example in which a pair of thick-walled parts 86 is formed in the surface layer 85, it being possible to inject butyl rubber in a molten state from the thick-walled parts 86; however, this is not provided by way of limitation. For example, a single thick-walled part 86, or three or more thick-walled parts 86, may be formed in the surface layer 85.

In the fifth embodiment, a description was given for an example in which the surface layer 95 is divided into two, i.e., into the first surface layer 97 and the second surface layer 98. However, this is not provided by way of limitation, and the surface layer 95 may be divided into three or more sections.

In the sixth embodiment, a description was given for an example in which the surface layer 105 is divided into two, i.e., into the first surface layer 107 and the second surface layer 108. However, this is not provided by way of limitation, and the surface layer 105 may be divided into three or more sections.

In the first through ninth embodiments, butyl rubber was indicated as an example of a self-adhesive elastic material. However, this is not provided by way of limitation. Other examples of a rubber that can be used include one or more types of rubber selected from polyisoprene rubber (IR), butadiene rubber (BR), styrene-butadiene rubber (SBR), chloroprene rubber and (CR), nitrile rubber (NBR), and natural rubber (NR) in which the energy loss is made greater through, inter alia, performing blending to bring the degree of vulcanization below that of the base material.

In the first through ninth embodiments, descriptions were given for examples in which the inter-ring 48 is divided into two, i.e., into the upper half-split link part 49 and the lower half-split link part 49. However, this is not provided by way of limitation, and the inter-ring 48 can be divided into three or more sections, or provided as a single C-shaped piece.

In addition, the shape and the configuration of elements such as the body frame, stabilizer rod, bush, base material, base material layer, opening, inter-ring, surface layer, through-hole, thick-walled part, protrusion, and the sealing material are not limited to those given as examples, and may be modified as appropriate.

INDUSTRIAL APPLICABILITY

The present invention is suitable for application in an automobile that includes a bush provided to the vehicle body and adapted so as to be capable of supporting a stabilizer rod against the vehicle body by the stabilizer rod being inserted through a through-hole.

REFERENCE SIGNS LIST

10 Stabilizer rod supporting structure
12 Body frame (vehicle body)
14 Stabilizer rod
20, 21 Left and right bushes (bushes)
45, 61, 71, 81, 91, 101 Base material
46 Base material layer
47, 72, 82, 92, 102 Opening
48 Inter-ring
51, 65, 75, 85, 95, 105 Surface layer
52, 96, 106 Through-hole
60, 70, 80, 90, 100, 120, 130, 140 Bush
65a, 65b Two axial ends
86 Thick-walled part
93, 103 Protrusion
93a, 103a Distal end part
122 Sealing material
D1 Inner diameter dimension (inner diameter)
D2 Outer diameter dimension (outer diameter)
T1, T5 Wall thickness of surface layer
T2a Wall thickness of base material
T2b Wall thickness of base material layer

The invention claimed is:

1. A bush for supporting a stabilizer rod against a vehicle body, said bush comprising:
a base material provided for attachment to the vehicle body and having an opening formed therein into which the stabilizer rod can be inserted;
an inter-ring integrally attached to the base material and extending around the opening, wherein a portion of the base material is disposed inside of the inter-ring; and
a surface layer made of a self-adhesive elastic material and integrally formed inside of the inter-ring and disposed at an inner circumferential surface of the opening, the surface layer having a thickness smaller than a wall thickness of the portion of the base material disposed inside of the inter-ring, the surface layer having a through-hole formed therein to receive the stabilizer rod,
wherein the self-adhesive elastic material allows the surface layer and the stabilizer rod to be brought into intimate contact with each other while being inhibited from slipping relative to each other, in a state in which the stabilizer rod is inserted through the through-hole of the surface layer, and
wherein the opening of the base material, exclusive of the surface layer, has an inside diameter set to be smaller than an outside diameter of the stabilizer rod in a state in which the stabilizer rod is not inserted through the through-hole of the surface layer.

2. The bush according to claim 1, wherein the base material includes an annular base material layer disposed between the inter-ring and the surface layer, and the thickness of the surface layer is smaller than a thickness of the base material layer; and
the thickness of the base material layer is larger than the thickness of the surface layer when the stabilizer rod is inserted through the through-hole.

3. The bush according to claim 1, wherein the base material has first and second annular projecting sections located at opposite ends of the opening in an axial direction of the opening, the first and second annular projecting sections being in abutment with respective opposite ends of the surface layer in an axial direction of the through-hole.

4. The bush according to claim 1, wherein the thickness of the surface layer varies in a circumferential direction of the surface layer.

5. The bush according to claim 4, wherein the thickness of the surface layer varies along an axial direction of the surface layer.

6. The bush according to claim 1, wherein the surface layer has, in a part thereof, a thick-walled part formed so as to have a larger wall thickness than a remaining part of the surface layer.

7. The bush according to claim 1, wherein:
the base material includes an annular protrusion located on an axial intermediate part of the inner circumferential surface of the opening, the annular protrusion having a distal end part exposed beyond the surface layer and caused to abut on the stabilizer rod; and
the surface layer is formed so as to be divided by the protrusion in an axial direction of the through-hole.

8. The bush according to claim 1, wherein the base material has a slit for opening up the opening, and the self-adhesive elastic material is extended from the surface layer into the slit.

9. The bush according to claim 1, wherein the base material is formed from natural rubber, the inter-ring is formed from metal, and the surface layer is formed from butyl rubber.

10. A bush for supporting a stabilizer rod against a vehicle body, said bush comprising:
a base material provided for attachment to the vehicle body and having an opening formed therein into which the stabilizer rod can be inserted;
an inter-ring integrally attached to the base material, wherein a portion of the base material is disposed inside of the inter-ring; and
a surface layer made of a self-adhesive elastic material and integrally formed on an inner circumferential surface of the inter-ring, the surface layer having a thickness smaller than a wall thickness of the portion of the base material disposed inside of the inter-ring, the surface layer having a through-hole formed therein to receive the stabilizer rod therethrough,
wherein the self-adhesive elastic material allows the surface layer and the stabilizer rod to be brought into intimate contact with each other while being inhibited from slipping relative to each other in a state in which the stabilizer rod is inserted through the through-hole of the surface layer, and
wherein the opening of the base material, exclusive of the surface layer, has an inside diameter set to be smaller than an outside diameter of the stabilizer rod in a state in which the stabilizer rod is not inserted in the through-hole of the surface layer.

11. The bush according to claim 10, wherein the base material is formed from natural rubber, the inter-ring is formed from metal, and the surface layer is formed from butyl rubber.

12. A bush for supporting a stabilizer rod against a vehicle body, said bush comprising:
- a bracket provided for attachment to the vehicle body;
- a base material formed from a natural rubber material and integrally attached to the bracket, the base material having an opening formed therein;
- a metal inter-ring integrally molded into the base material and extending around the opening, wherein a portion of the base material is disposed inside of the inter-ring; and
- a surface layer formed from a slip-resistant butyl rubber material and disposed as an annular liner inside of the inter-ring, the surface layer having a thickness smaller than a wall thickness of the portion of the base material disposed inside of the inter-ring, the surface layer having a through-hole formed therein to receive the stabilizer rod,
- wherein the slip-resistant butyl rubber material of the surface layer allows the surface layer and the stabilizer rod to be brought into intimate contact with each other while being inhibited from slipping relative to each other, in a state in which the stabilizer rod is inserted through the through-hole of the surface layer, and
- wherein the opening of the base material, exclusive of the surface layer, has an inside diameter set to be smaller than an outside diameter of the stabilizer rod in a state in which the stabilizer rod is not inserted through the through-hole of the surface layer.

\* \* \* \* \*